US011687148B1

(12) United States Patent
Montoye et al.

(10) Patent No.: US 11,687,148 B1
(45) Date of Patent: Jun. 27, 2023

(54) STACKED, RECONFIGURABLE CO-REGULATION OF PROCESSING UNITS FOR ULTRA-WIDE DVFS

(71) Applicant: International Business Machines Corporation, Armonk, NY (US)

(72) Inventors: Robert K. Montoye, Yorktown Heights, NY (US); Kevin Tien, Trumbull, CT (US); Yutaka Nakamura, Kyoto (JP); Jeffrey Haskell Derby, Chapel Hill, NC (US); Martin Cochet, South Salem, NY (US); Todd Edward Takken, Brewster, NY (US); Xin Zhang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/729,638

(22) Filed: Apr. 26, 2022

(51) Int. Cl.
*G06F 1/00* (2006.01)
*G06F 1/3296* (2019.01)
*G06F 1/324* (2019.01)

(52) U.S. Cl.
CPC ............ *G06F 1/3296* (2013.01); *G06F 1/324* (2013.01)

(58) Field of Classification Search
CPC ................................ G06F 1/3296; G06F 1/324
See application file for complete search history.

(56) References Cited

U.S. PATENT DOCUMENTS 6,922,066 B2   7/2005   Hidaka
7,786,786 B2   8/2010   Kirichenko
8,250,395 B2   8/2012   Carter et al.
(Continued)

FOREIGN PATENT DOCUMENTS

JP    3936889 B2     6/2007
JP    4402136 B2     1/2010
WO    2004102628 A2  11/2004

OTHER PUBLICATIONS

C. Fourie, "Single Flux Quantum Circuit Technology and CAD overview," 2018 IEEE/ACM International Conference on Computer-Aided Design (ICCAD), 2018, pp. 1-6, doi: 10.1145/3240765. 3243498.
P. Yuh, "A 512-bit shift register using compact two-phase single flux quantum clock generators with large margins and low power," in IEEE Transactions on Applied Superconductivity, Dec. 1993, pp. 3116-3118, vol. 3, No. 4, doi: 10.1109/77.251814.
G. Pasandi, A. Shafaei and M. Pedram, "SFQmap: A Technology Mapping Tool for Single Flux Quantum Logic Circuits," 2018 IEEE International Symposium on Circuits and Systems (ISCAS), 2018, pp. 1-5, doi: 10.1109/ISCAS.2018.8351603.
(Continued)

*Primary Examiner* — Nitin C Patel
(74) *Attorney, Agent, or Firm* — Scully, Scott, Murphy & Presser, P.C.; Daniel P. Morris

(57) ABSTRACT

A system and method for supporting an interconnection of processor cores, each core with functional state monitors for monitoring operations of each processor core, the processor cores interconnected using a resistive network connected between two-terminal regions being embedded in the resistive network such that each terminal of a region may be connected by controllable resistors to one or both fixed rails or by controllable resistors to one or more intermediate nodes. The resistor values are configurable to provide indirect control of the voltages across each two-terminal region, allowing full dynamic control of voltages of the two-terminal regions in a range up to the full voltage between the two voltage rails, and where a management unit accesses the functional state monitors and controls the resistor values. Feedback from functional state monitors allow the operating frequency to extend down to arbitrarily low values and up to the limits imposed by the technology.

20 Claims, 20 Drawing Sheets

(56) References Cited

U.S. PATENT DOCUMENTS

| | | |
|---|---|---|
| 8,327,158 B2 | 12/2012 | Titiano et al. |
| 8,476,962 B2 | 7/2013 | Pelley |
| 8,516,426 B2 | 8/2013 | Bose et al. |
| 9,710,586 B2 | 7/2017 | Muller et al. |
| 9,733,978 B2 | 8/2017 | Suarez et al. |
| 9,876,505 B1 | 1/2018 | Dai et al. |
| 10,069,410 B1 | 9/2018 | Chang et al. |
| 10,599,481 B2 | 3/2020 | Pistol et al. |
| 10,651,808 B2 | 5/2020 | Egan et al. |
| 10,658,335 B2 | 5/2020 | Gu et al. |
| 10,795,853 B2 | 10/2020 | Nassif et al. |
| 11,137,822 B2 | 10/2021 | Gelman et al. |
| 2005/0036254 A1 | 1/2005 | Premerlani et al. |
| 2014/0266327 A1 | 9/2014 | Ancis et al. |
| 2021/0081209 A1 | 3/2021 | Meswani et al. |
| 2021/0208803 A1 | 7/2021 | Myers et al. |

OTHER PUBLICATIONS

A. Chattopadhyay and Z. Zilic, "Flexible and Reconfigurable Mismatch-Tolerant Serial Clock Distribution Networks," in IEEE Transactions on Very Large Scale Integration (VLSI) Systems, Mar. 2012, pp. 523-536, vol. 20, No. 3, doi: 10.1109/TVLS1.2011.2104982.

List of IBM Patents or Patent Applications Treated as Related, filed herewith, pp. 2.

Takeo Yasuda et al., "Asymmetrical Clock Separation and Stage Delay Optimization in Single Flux Quantum Logic", U.S. Appl. No. 17/729,614, filed Apr. 26, 2022, 30 pages.

STACKED, RECONFIGURABLE CO-REGULATION OF PROCESSING UNITS FOR ULTRA-WIDE DVFS

STATEMENT REGARDING FEDERALLY SPONSORED RESEARCH OF DEVELOPMENT

This invention was made with U.S. Government support under Contract. No. HR0011-18-C-0122 awarded by the Defense Advanced Research Projects Agency (DARPA). The government has certain rights to this invention.

FIELD

The present invention generally relates to design and operation of integrated circuits (ICs), particularly ICs including stacked processor core circuit structures, and more specifically relates to systems and methods for automatically optimizing voltage and frequency control of stacked processor core circuit structures.

BACKGROUND

There is a need for processor optimization across the spectrum of computational problems from strongly scaling, highly-parallelizable problems down to weakly scalable problems, but without the need to implement a set of heterogeneous processor designs individually targeted to the individual problems. One way to achieve this is to implement voltage-domain heterogeneity over a set of homogeneous processors. However, conventional techniques for individualized voltage-domain control imply per-core implementations of dynamically controllable voltage regulators. Additionally, to maintain performance at low supply voltage, low-threshold-voltage devices may be required to extend the operational margins, which incurs a leakage penalty at nominal supply voltage.

The most aggressively integrated switched-inductor technologies still set a high threshold for minimum area per regulator, while precludes arbitrary per-processor scaling down in area, and switched-capacitor regulators are limited in the available current density, precluding per-processor scaling up in power consumption. Fully-integrated switched-inductor regulators and even moderately high-power-density-capable switched-capacitor regulators require costly/non-standard fabrication technologies. Per-core linear regulators are also inefficient at low conversion ratios.

SUMMARY

There is provided circuit systems and methods for automatically and dynamically optimizing voltage and frequency scaling control and co-regulation of stacked processor core circuit structures for ultra-wide dynamic voltage and frequency scaling (DVFS).

There is provided circuit systems and methods for automatically and dynamically optimizing voltage and frequency control of voltage stacked processor core circuit structures that obviates the need for dedicated switched-capacitor/switched-inductor voltage regulators.

A system framework implementing methods for defining and controlling an electrical network of processing cores interconnected by controllable resistive elements to improve energy efficiency from charge recycling.

The system framework implements methods for defining and controlling an electrical network of processing cores in such a way that dynamic re-configuration of the controllable resistive elements allows trade-offs between computational performance and power efficiency by dynamically implementing indirect voltage regulation in a manner allowing for zero effective power loss to non-computational functionality during high-efficiency modes, while also leaving the possibility for processing elements to run in a full rail, high-performance mode.

The methods revolve around granular sensing for functional correctness using, e.g., critical path timing in replica circuits embedded in each processing core and actuating the controllable resistive elements to minimize power consumption while maximizing functional on-time for all processor cores.

The system framework of processing elements and resistive elements may span a single silicon die or expand across a multi-die framework.

An ultra-wide voltage range of core operation (e.g., 2× voltage, 4× energy per operation and about 3× in frequency) without a separate regulator and the corresponding cost, power efficiency decrease, area, and/or need for special components. This is achieved by embedded basic blocks comprising processing cores in a small network of controllable resistances that allows for limited topological re-configurability of the processing cores between modes that tradeoff between computational performance and power efficiency. Additional circuitry is provided for communication between cores when they are configured to be in disparate voltage domains.

The system and methods herein are not concerned with explicit voltage regulation, but rather with control of voltage domains via resistor value changes in order to hit a target functional frequency specification, with no high-speed voltage feedback. This allows for simple closed-loop dynamic voltage scaling, but with the voltage set indirectly and automatically.

The methods of this disclosure obviate the need for dedicated switched-capacitor/switched-inductor voltage regulators while implementing indirect voltage regulation. In a further aspect, the system and method are configured to pair cores (e.g., 1 upper core, multiple lower processor cores) to improve efficiency, or pair multiple upper cores, multiple lower cores to improve efficiency.

A system and method that provides a controllable resistance or tunable current supply device between the processor blocks, which splits the 'regulated rail' or 'virtual node' into two separate rails for the top and bottom portion of the stack, providing a new degree of freedom. In particular, this allows for a mechanism to suppress leakage in power-down cores, making the use of ultra-low-threshold voltage devices far more attractive.

In accordance with one aspect of the invention, there is provided a system for dynamic voltage and frequency scaling of operating processing cores. The system comprises:

a stacked circuit configuration including at least two or more processor core devices, each processor core device having a first terminal for connection to a first voltage rail conductor and having a second terminal connection for connection to a second lower voltage rail conductor, each of the processor core device comprising a state monitor unit for monitoring a functional state of the processor core device;

a current provision network comprising first tunable current supplying devices interconnecting first terminals of a plurality of the at least two or more processor core devices to the first voltage rail conductor and second tunable current supplying devices interconnecting the second terminals of a plurality of the at least two or more processor core devices to the second lower voltage rail conductor, and a plurality of tunable bridge current supplying devices interconnecting a first terminal of each of a respective subset of processor core devices to a second terminal of each of a plurality of other processor core devices of the subset; and a control unit including a processor for receiving real-time functional state monitor signals issuing from the state monitor unit of the processor core devices and issuing one or more control signals and for adjusting a resistance of one or more the first tunable current supplying devices, the second tunable current supplying devices or the tunable bridge current supplying devices to thereby adjust a voltage across a processor core device to achieve a target frequency of operation at the processor core in response to the received real-time state monitor signals.

According to a further aspect, there is provided a method for dynamic voltage and frequency scaling of operating processing cores. The method comprises: configuring one or more processor core units in a voltage stacked circuit configuration, each stacked processor core unit comprising: a lower processor core device having a first terminal connected to a first voltage rail conductor through a first tunable current supplying device and a second terminal connected directly to a second lower voltage rail conductor, one or more upper processor core devices, each upper core device having a first terminal directly connected to the first voltage rail conductor and a second terminal connected to the second lower voltage rail conductor through a second tunable current supplying device, wherein the upper processor core device and lower processor core device each comprises a state monitor unit for monitoring a functional state of that processor core device and generating corresponding feedback signals; and a respective tunable bridge current supplying device interconnecting the first terminal of the lower processor core device to the second terminal of each respective one or more upper processor core devices; and controlling, using a control processor, based on the feedback signals obtained from each the state monitor unit of a lower processor core device or upper processor core device, a resistance value of one or more the first tunable current supplying device, the second tunable current supplying device and the tunable bridge current supplying device to ensure stable functional operation of the lower or upper processor core devices to achieve a target voltage or frequency of the respective lower or upper processor core.

In a further aspect, there is provided a method for dynamically controlling stacked processor core network including multiple operating processor core devices. The method comprises: configuring a resistance value of a first tunable current supplying device connecting a higher voltage terminal of a lower processor core device to a first voltage rail conductor, a lower voltage terminal of the lower processor core device connected directly to a second lower voltage rail conductor; configuring a resistance value of each of multiple second tunable current supplying devices, each respective second tunable current supplying device connecting a lower voltage terminal of a respective the upper core device of multiple second processor core devices to the second lower voltage rail conductor, a higher voltage terminal of each respective the upper core device of multiple upper processor core devices connected directly to the first voltage rail conductor; configuring a resistance value of each of multiple tunable bridge current supplying devices, each respective tunable bridge current supplying device interconnecting the lower voltage terminal of each respective multiple upper processor core device to the higher voltage terminal of the lower processor core device, wherein each upper processor core device and lower processor core device comprises a state monitor unit for monitoring a timing margin state of that respective upper processor core or lower processor core device and generating a corresponding feedback signal; detecting, using a functional state monitor device at each the operating processor core device currently paired to one or more other processor core devices, when a functional timing margin state condition changes at the operating processor core device; generating, by the respective functional state monitor device, a feedback signal when the timing margin state condition changes at the operating processor core device; and tuning, using a control processor, based on the generated feedback signal, the resistance value of one or more the first tunable current supplying device, the second tunable current supplying device or one or more respective the tunable bridge current supplying devices to achieve an optimal timing margin at the operating processor core device and respective currently paired one or more other processor core devices.

Further features as well as the structure and operation of various embodiments are described in detail below with reference to the accompanying drawings. In the drawings, like reference numbers indicate identical or functionally similar elements.

DETAILED DESCRIPTION

The present disclosure provides a system framework implementing methods of defining and controlling an electrical network of processing cores interconnected by controllable resistive elements in such a way that dynamic re-configuration of the resistive elements allows trade-offs between computational performance and power efficiency.

The system framework implements circuit systems and methods for automatically and dynamically optimizing voltage and frequency scaling control and co-regulation of stacked processor core circuit structures for ultra-wide dynamic voltage and frequency scaling (DVFS). As referred to herein, a "stacked" microprocessor core circuit structure refers to a voltage stacking whereby voltage "domains" are functionally stacked in essentially a series configuration where a single high voltage is delivered to the cores in series rather than delivering current in parallel.

Figure 1:
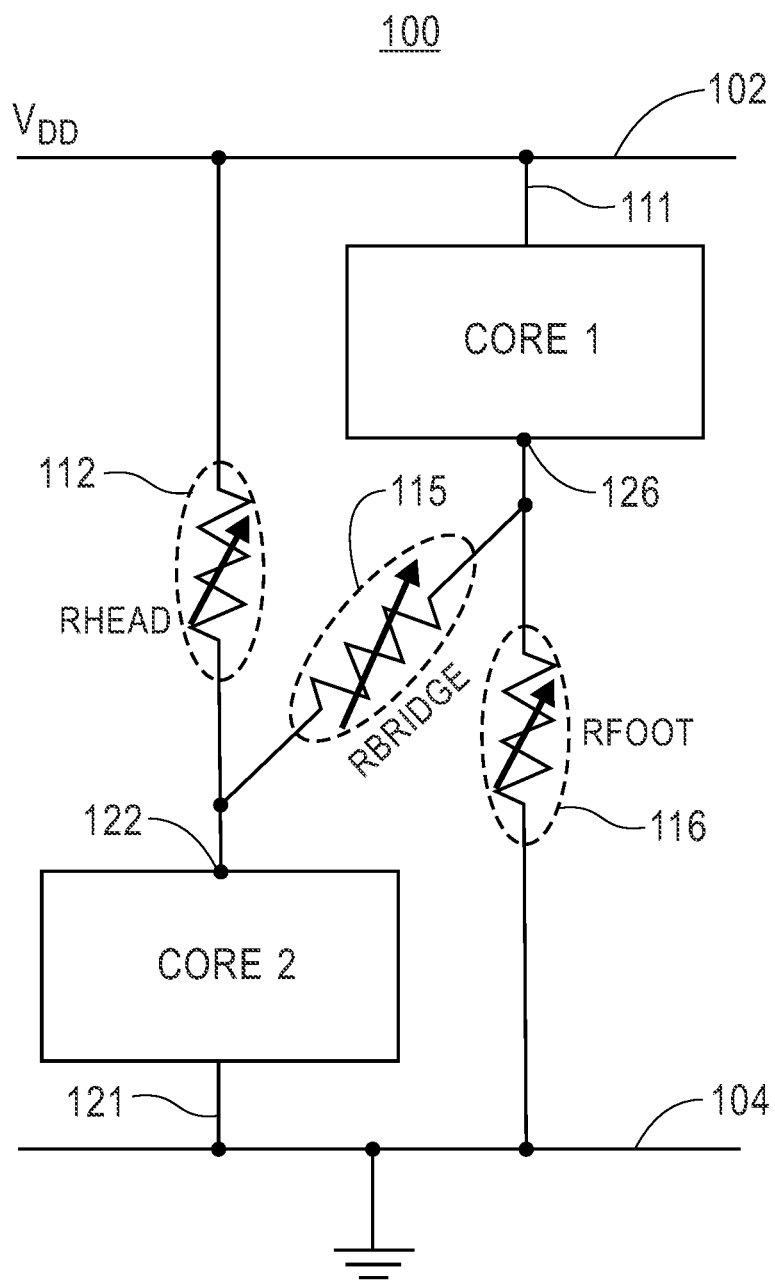
FIG. 1 illustrates a stacked processor core circuit structure for optimized dynamic voltage and frequency scaling control according to a first embodiment.

FIG. 1 illustrates a stacked processor core circuit structure 100 for optimized dynamic voltage and frequency scaling control according to a first embodiment. Two microprocessor circuit cores, e.g., upper Core 1 and lower Core 2, are implemented in one or multiple integrated circuits (ICs) that may include a stack of multiple microprocessor cores. As an example, each microprocessor circuit core can be its own IC. Each microprocessor circuit Core 1 and Core 2 of stacked processor core circuit structure 100 includes an input adapted for connection to a voltage rail conductor 102 for receiving a Vdd voltage from a power source (not shown) for powering the circuit cores of the IC. Further, each microprocessor circuit Core 1 and Core 2 of stacked processor core circuit structure 100 includes an input connection to a voltage reference conductor 104, e.g., providing a ground potential for the circuit cores. Each individual processor circuit core is configured for operating at a target operating frequency (e.g., clock frequency) for performing computations, and/or configured for operating at a target operating voltage.

In the stacked processor core circuit structure 100 for optimized dynamic voltage and frequency scaling control of FIG. 1, there is provided a direct connection 111 from the Vdd voltage rail conductor 102 to the Core 1 Vdd voltage rail input. The stacked processor core circuit structure 100 for optimized dynamic voltage and frequency scaling control includes, for Core 2, a top or upper resistive device 112 (referred to herein as $R_{HEAD}$ or RV) having a first connection to the voltage rail conductor 102 and a second connection 122 to the Core 2 Vdd voltage rail input for receiving Vdd power voltage at the Core 2 processor. The Core 2 processor thus receives power voltage through upper resistive device 112.

In the stacked processor core circuit structure 100 for optimized dynamic voltage and frequency scaling control of FIG. 1, there is provided a direct connection 121 from the ground reference conductor 104 to the Core 2 core's ground connection. The stacked processor core circuit structure 100 for optimized dynamic voltage and frequency scaling control includes, for Core 1, a lower resistive device 116 (referred to herein as $R_{FOOT}$ or RG) having a first connection to the ground conductor 104 and having a second connection 126 to the Core 1 input providing the ground reference potential to the Core 1 processor. The stacked processor core circuit structure 100 for optimized dynamic voltage and frequency scaling control further includes a continuously tunable bridge resistance device 115 (referred to herein as $R_{BRIDGE}$) having a first connection to voltage rail input connection 122 at the Core 2 processor and having a second connection to the ground reference potential input connection 126 at the Core 1 processor. Each upper resistive device 112, lower resistive device 116 and tunable bridge resistance device 115 are continuously tunable to achieve a short circuit resistance (e.g., 0 ohm or a negligible value), an open circuit resistance (e.g., infinite ohms) and any resistance value between 0 and ∞. In an implementation, the circuit of FIG. 1, and particularly, each of the resistive device values are configured to control the voltages across each processor core to achieve a target frequency at a particular core.

In embodiments, the resistor values are set to provide current recycling, whereby some of the current passing through a first two-terminal region (e.g., ground and power supply rail terminals of a processor core) also passes through one or more additional two-terminal regions (i.e., ground and power supply rail terminals of additional series-connected processor cores). The two-terminal regions are arranged in an array of one or more dimensions, and wherein the two-terminal regions span a range of physical positions in each of the one or more physical dimensions.

Figure 2B:
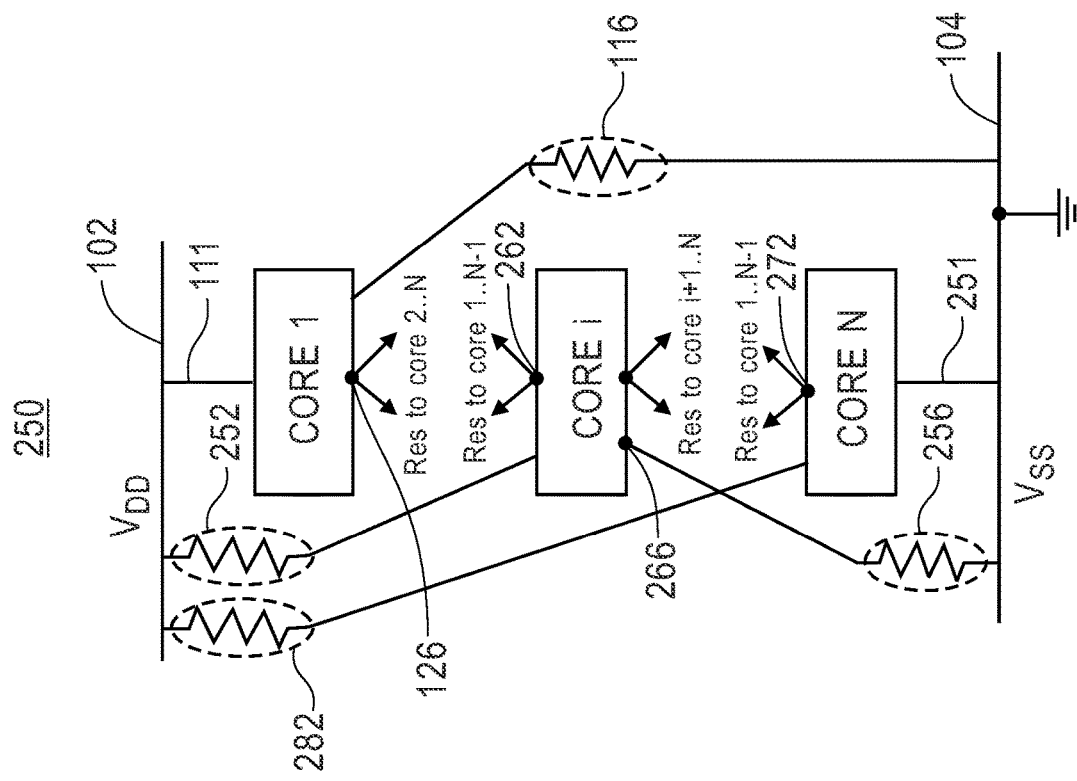
FIGS. 2A and 2B illustrate further embodiments of a stacked processor core circuit structure for optimized dynamic voltage and frequency scaling control.
Figure 2A:
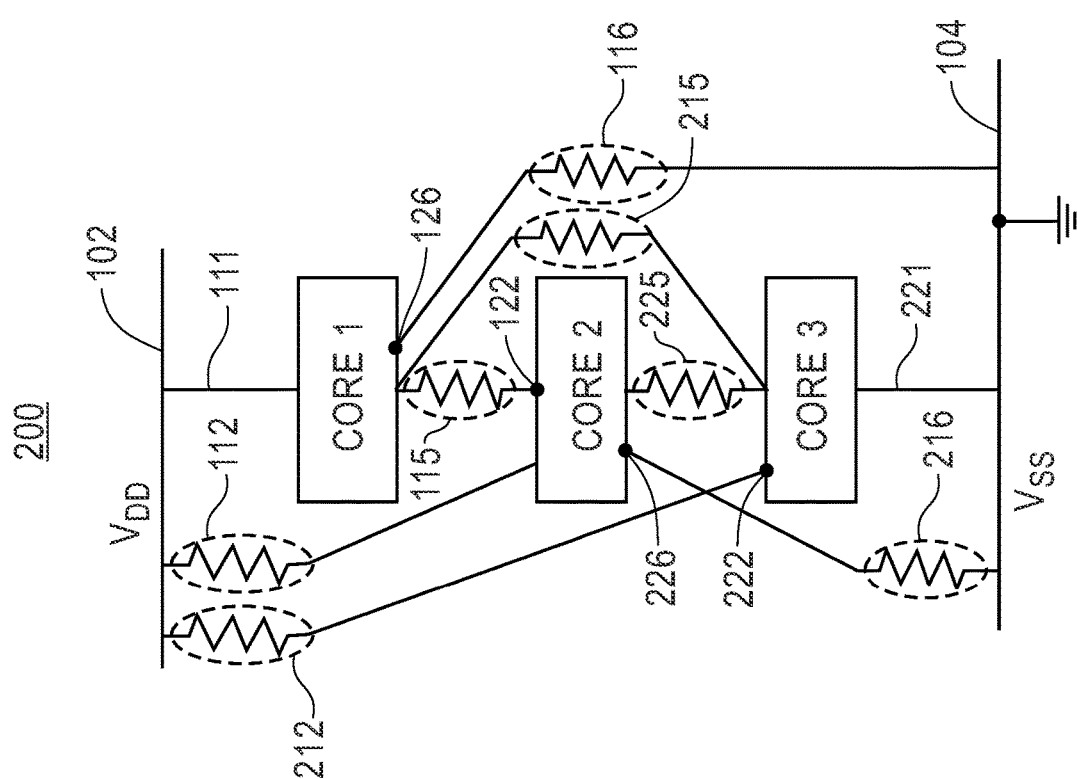

FIG. 2A illustrates a further embodiment of a stacked processor core circuit structure 200 for optimized dynamic voltage and frequency scaling control. The embodiment of FIG. 2A expands the stacked processor core circuit structure 100 of FIG. 1 to include a further (third) stacked microprocessor circuit core, i.e., Core 3, implemented in the same integrated circuit (IC) or a separate external IC chip.

In the stacked microprocessor core structure 200 of FIG. 2A, microprocessor circuit Core 1 includes the first direct connection 111 to Vdd voltage rail conductor 102 and includes the connection to ground conductor 104 through the lower resistive device 116 that connects ground potential conductor 104 to the Core 1 ground reference potential input connection 126.

Microprocessor circuit Core 2 includes the first connection to Vdd voltage rail conductor 102 through upper tunable resistive device 112 and the tunable bridge resistance device 115 connects the voltage rail input connection 122 of Core 2 to the ground reference potential connection 126 of Core 1. However, in the embodiment of FIG. 2A, Core 2 further includes a connection to ground conductor 104 through a further lower tunable resistive device 216 that connects ground potential conductor 104 to a Core 2 ground reference potential input connection 226.

Further, in the stacked microprocessor core structure 200 of FIG. 2A, microprocessor circuit Core 3 includes a Vdd voltage rail input 222 for receiving power from Vdd power source through a tunable upper resistive device 212 having a first connection to the voltage rail conductor 102 and the second connection to the Core 3 Vdd voltage rail input 222. The Core 3 processor thus receives power voltage through tunable upper resistive device 212. Microprocessor circuit Core 3 further includes a direct ground connection 221 to ground potential conductor 104.

A further tunable bridge resistance device 215 also connects the voltage rail input connection 222 of Core 3 to the ground reference potential connection 126 of Core 1. Further in the stacked microprocessor core structure 200 of FIG. 2A, a further tunable bridge resistance device 225 is provided that connects the voltage rail input connection 222 of Core 3 to the ground reference potential connection 226 of Core 2.

FIG. 2B shows a further embodiment of a stacked processor core circuit structure 250 for optimized dynamic voltage and frequency scaling control. The embodiment of FIG. 2A expands the stacked processor core circuit structure 200 of FIG. 2A to include an implementation of multiple (N) stacked microprocessor circuit cores. In embodiments, some or all of the N microprocessor circuit cores can be located in a single system on chip (i.e., single silicon die) or reside on different physical IC chips (i.e., expand across a multi-die framework).

In the stacked processor core circuit structure 250 of FIG. 2B, each core i (i=1, 2, ..., N) has N+1 resistor connections: to VDD power conductor 102, to VSS ground potential conductor 104 and to the N−1 other cores. Except that the resistances from Core 1 to VDD power conductor 102 and core N to VSS ground potential conductor 104 are negligible (wires).

For example, in the embodiment of FIG. 2B, at Core 1, besides the direct connection 111 to VDD power conductor 102 and connection at Core 1 ground connector 126 to group potential conductor 104 through tunable lower resistance device 116, there includes multiple connections to remaining cores through respective tunable bridge resistances, i.e., a respective connection from ground conductor input 126 at Core 1 to each of remaining Cores 2, ..., Core N through a respective tunable bridge resistance (not shown). Similarly, at Core i, there is provided a connection from power input connector 262 to the Vdd voltage power conductor 102 through tunable upper resistor device 252 and a connection from ground potential connection 266 to the Vss ground reference potential conductor 104 through tunable lower resistor device 256. Further in the stacked processor core circuit structure 250, there includes multiple connections to remaining cores through respective tunable bridge resistances, i.e., a respective connection from power conductor input 262 at Core i to each of Cores 1, ..., Core N−1 through a respective tunable bridge resistance (not shown). Similarly, at Core i, there are provided multiple connections to remaining cores through respective tunable bridge resistances, i.e., a respective connection from ground conductor input 226 at Core i to each of remaining Cores i+1, ..., Core N through a respective tunable bridge resistance (not shown).

Further in the stacked processor core circuit structure 250 of FIG. 2B, at Core N, there is provided a direct connection 251 from a ground reference connection to Vss ground reference potential conductor 104 and a connection at Core N power voltage connector 272 to Vdd power conductor 102 through tunable upper resistance device 282. Further, there includes multiple connections to remaining cores through respective tunable bridge resistances, i.e., a respective connection from power voltage connector 272 at Core N to each of remaining Cores 1, ..., Core N−1 through a respective tunable bridge resistance (not shown).

The "stacked" circuit core structures of FIGS. 1, 2A-2B are essentially a series connected topology in that some of the current that flows through Core 1 will go through the tunable bridge resistor to a series connected Core 2, e.g., and through other multiple core "stacked" in series, e.g., through respective tunable bridge resistors.

Figure 3:
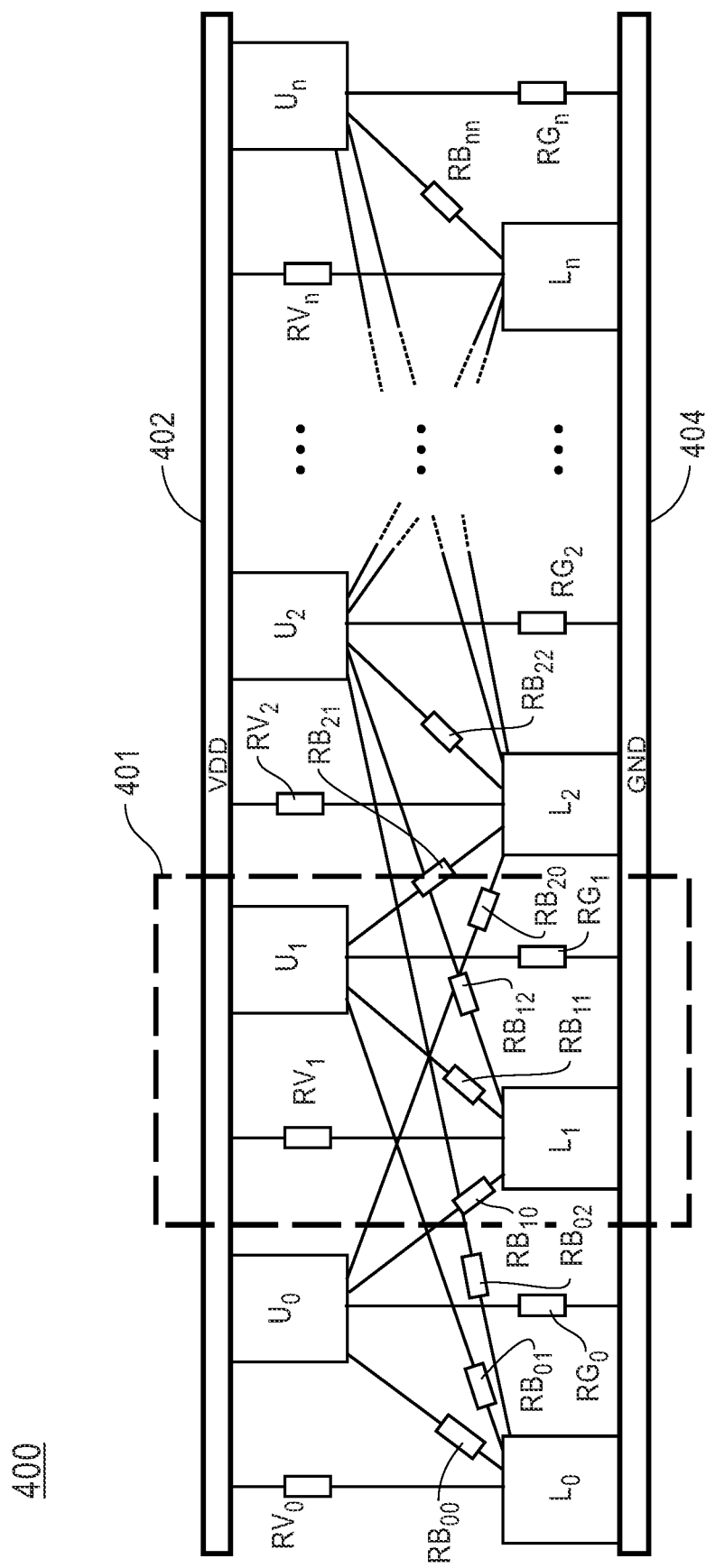
FIG. 3 depicts a split level regulation system including a power voltage conductor, a ground reference potential conductor an interconnection of upper and lower processor cores and tunable resistive devices and shows a circuit portion including a unit comprising an upper core and lower core pair and corresponding tunable bridge connections in an embodiment.

FIG. 3 depicts a split level regulation system 400 including a Vdd power voltage conductor 402, a Vss ground reference potential conductor 404 and an interconnection of upper and lower processor cores and tunable resistive devices. The interconnections include: a plurality lower cores $L_0, L_1, L_2, \ldots, L_n$ connected to ground conductor 404, a corresponding plurality of upper cores $U_0, U_1, U_2, \ldots U_n$ connected to power voltage conductor 402, an interconnection of corresponding multiple tunable upper resistive devices $RV_0, RV_1, RV_2, \ldots, RV_n$ connecting a respective lower processor core $L_0, L_1, L_2, \ldots, L_n$ to the power voltage conductor 402, an interconnection of corresponding multiple tunable lower resistive devices $RG_0, RG_1, RG_2, \ldots, RG_n$ connecting a respective upper processor core $U_0, U_1, U_2, \ldots, U_n$ to the ground reference potential conductor 404, and an interconnection of a plurality of tunable bridge resistances interconnecting each lower processor core to each of a plurality of upper processor cores. One or more of the processor cores may be located on a same integrated circuit chip or distributed IC chips. For example, lower processor core $L_0$ includes tunable bridge resistive device connections $RB_{00}, RB_{01}, RB_{02}, \ldots, RB_{0n}$ to each of upper processor core $U_0, U_1, U_2, \ldots, U_n$; lower processor core $L_1$ includes tunable bridge resistive device connections $RB_{10}, RB_{111}, RB_{12}, \ldots, RB_{2n}$ to each of upper processor core $U_0, U_1, U_2, \ldots, U_n$; lower processor core $L_2$ includes tunable bridge resistive device connections $RB_{20}, RB_{21}, RB_{22}, \ldots, RB_{2n}$ to each of upper processor core $U_0, U_1, U_2, \ldots, U_n$. Lower processor core $L_n$ includes tunable bridge resistive devices to each of upper processor cores $U_0, U_1, U_2, \ldots$ including tunable bridge resistive device $RB_{nn}$ connected to upper processor core $U_n$. As shown in FIG. 3, a respective circuit portion 401 that includes a pair of upper and lower cores, e.g., cores $U_1, L_1$, and corresponding tunable bridge connections, e.g., $RV_1, RB_1$, and $RG_1$ comprise a stacked processor core circuit structure 100 of FIG. 1. It should be understood that each resistive device $RV_i$ is like low-dropout (LDO) regulator loads from Vdd to $L_i$ (i=0, 1, 2, ..., n), resistive devices $RG_i$ are like LDO regulator loads from ground (GND) to $U_i$ (i=0, 1, 2, ..., n) and tunable bridge resistive devices $RB_{ij}$ are bridge loads from $U_i$ to $L_j$ (i=0, 1, 2, ..., n; j=0, 1, 2, ..., n).

Figure 4:
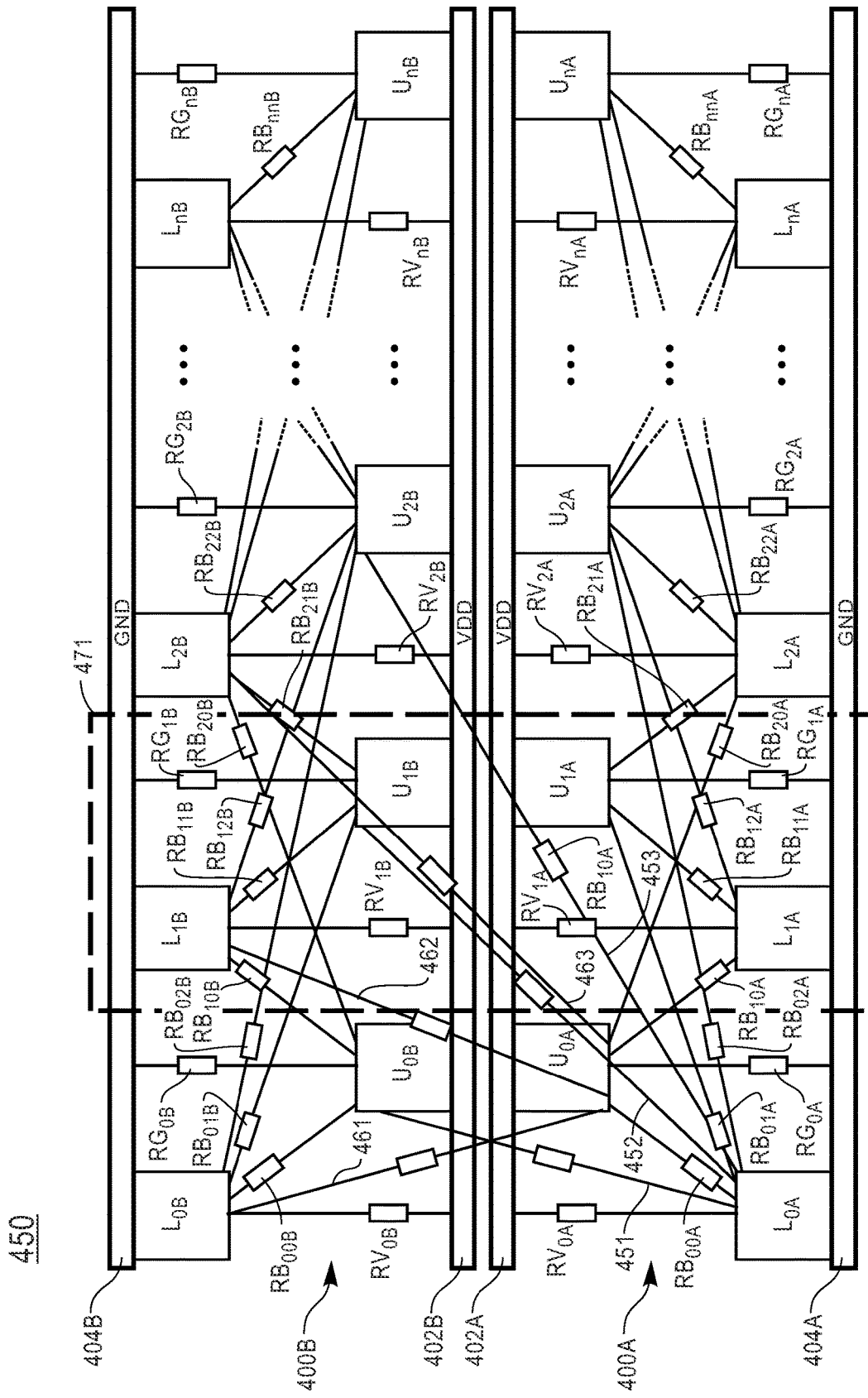
FIG. 4 depicts a further embodiment of a stacked multi-core system including two parallel connected split level regulation systems each of the type shown in FIG. 3.

FIG. 4 depicts a further embodiment of a stacked multi-core system 450 including two connected split level cloud regulation systems 400A, 400B of the type shown in FIG. 3. Split level cloud regulation system 400A includes: first Vdd power voltage conductor 402A and first Vss ground reference potential conductor 404A, respective upper processor cores $U_{0A}$, $U_{1A}$, $U_{2A}$, . . . , $U_{nA}$ and lower processor cores $L_{0A}$, $L_{1A}$, $L_{2A}$, . . . , $L_{nA}$ and includes the same interconnection of tunable upper resistive devices $RV_{0A}$, $RV_{1A}$, $RV_{2A}$, . . . , $RV_{nA}$ connecting a respective lower processor core $L_{0A}$, $L_{1A}$, $L_{2A}$, . . . , $L_{nA}$ to the power voltage conductor 402A, and similarly includes the same interconnection of tunable lower resistive devices $RG_{0A}$, $RG_{1A}$, $RG_{2A}$, . . . , $RG_{nA}$ connecting a respective upper processor core $U_{0A}$, $U_{1A}$, $U_{2A}$, . . . , $U_{nA}$ to the Vss ground reference potential conductor 404A. Additionally provided are an interconnected plurality of tunable bridge resistances interconnecting each lower processor core to each of a plurality of upper processor cores, e.g., lower processor core LOA includes tunable bridge resistive device connections $RB_{00A}$, $RB_{01A}$, $RB_{02A}$, . . . , $RB_{0nA}$ to each respective upper processor core $U_{0A}$, $U_{1A}$, $U_{2A}$, . . . , $U_{nA}$; lower processor core $L_{1A}$ includes tunable bridge resistive device connections $RB_{10A}$, $RB_{11A}$, $RB_{12A}$, . . . , $RB_{1nA}$ to each of upper processor core $U_{0A}$, $U_{1A}$, $U_{2A}$, . . . , $U_{nA}$ respectively; lower processor core $L_{2A}$ includes tunable bridge resistive device connections $RB_{20A}$, $RB_{21A}$, $RB_{22A}$, . . . , $RB_{2nA}$ to each of upper processor core $U_{0A}$, $U_{1A}$, $U_{2A}$, . . . , $U_{nA}$ respectively. Lower processor core $L_{nA}$ includes tunable bridge resistive devices to each of upper processor cores $U_{0A}$, $U_{1A}$, $U_{2A}$, . . . and including tunable bridge resistive device $RB_{nnA}$ connected to upper processor core $U_{nA}$.

As shown in FIG. 4, parallel connected split level cloud regulation system 400B is similarly configured and includes Vdd power voltage conductor 402B and Vss ground reference potential conductor 404B, respective upper processor cores $U_{0B}$, $U_{1B}$, $U_{2B}$, . . . , $U_{nB}$ and lower processor cores $L_{0B}$, $L_{1B}$, $L_{2B}$, . . . , $L_{nB}$ and includes the same interconnection of tunable upper resistive devices $RV_{0B}$, $RV_{1B}$, $RV_{2B}$, . . . , $RV_{nB}$ connecting a respective lower processor core $L_{0B}$, $L_{1B}$, $L_{2B}$, . . . , $L_{nB}$ to the power voltage conductor 402B, and similarly includes the same interconnection of tunable lower resistive devices $RG_{0B}$, $RG_{1B}$, $RG_{2B}$, . . . , $RG_{nB}$ connecting a respective upper processor core $U_{0B}$, $U_{1B}$, $U_{2B}$, . . . , $U_{nB}$ to the Vss ground reference potential conductor 404B. The Vdd power supply rail 402A, 402B can be a single conductor that is shared between the two systems 400A, 400B. Additionally provided are an interconnected plurality of tunable bridge resistances interconnecting each lower processor core to each of a plurality of upper processor cores, e.g., lower processor core $L_{0B}$ includes tunable bridge resistive device connections $RB_{00B}$, $RB_{01B}$, $RB_{02B}$, . . . , $RB_{0nB}$ to each respective upper processor core $U_{0B}$, $U_{1B}$, $U_{2B}$, . . . , $U_{nB}$; lower processor core $L_{1B}$ includes tunable bridge resistive device connections $RB_{10B}$, $RB_{11B}$, $RB_{12B}$, . . . , $RB_{1nB}$ to each respective upper processor core $U_{0B}$, $U_{1B}$, $U_{2B}$, . . . , $U_{nB}$; lower processor core $L_{2B}$ includes tunable bridge resistive device connections $RB_{20B}$, $RB_{21B}$, $RB_{22B}$, . . . , $RB_{2nB}$ to each respective upper processor core $U_{0B}$, $U_{1B}$, $U_{2B}$, . . . , $U_{nB}$. Lower processor core $L_{nB}$ includes tunable bridge resistive devices to each of upper processor cores $U_{0B}$, $U_{1B}$, $U_{2B}$, . . . and including tunable bridge resistive device $Rb_{nnB}$ connected to upper processor core $U_{nB}$.

As shown in FIG. 4, parallel connected split level cloud regulation system 450 include further tunable bridge resistive devices connecting lower processor cores in circuit 400A to upper processor cores in circuit 400B and further includes tunable bridge resistive devices connecting upper processor cores in circuit 400A to lower processor cores in circuit 400B. In a general embodiment, some set of n lower cores may be connected to a set of k upper cores through potentially distinct RBRIDGE resistive devices. For instance, a respective tunable bridge resistive device 451, 452 and 453 is provided for connecting lower processor core $L_{0A}$ to each upper processor cores $U_{0B}$, $U_{1B}$, $U_{2B}$. As further shown, parallel connected split level cloud regulation system 450 include further tunable resistive devices connecting upper processor cores in circuit 400A to lower processor cores in circuit 400B. For instance, a respective tunable bridge resistive device 461, 462 and 463 is provided for connecting upper processor core $U_{0A}$ to each lower processor cores $L_{0B}$, $L_{1B}$, $L_{2B}$ respectively, e.g., realized on a single silicon chip.

Further depicted in FIG. 4 is a unit cell that comprises a respective circuit portion 471 having a pair of upper and lower cores, e.g., processor cores $U_{1A}$, $L_{1A}$ and corresponding tunable bridge connections, e.g., $RV_{1A}$, $RB_{1A}$, $RG_{1A}$ and processor $U_{1B}$, $L_{1B}$ and corresponding tunable bridge connections, e.g., $RV_{1B}$, $RB_{11B}$, $RG_{1B}$, each configured according to the stacked processor core circuit structure 401 of FIG. 3. Although not shown in FIG. 4, the respective circuit portion 471 can include further tunable resistive devices connecting lower processor core $L_{1A}$ in circuit 400A to upper processor core $U_{1B}$ in circuit 400B and further includes tunable resistive devices connecting upper processor core $U_{1A}$ in circuit 400A to lower processor core $L_{1B}$ in circuit 400B. For clarity, FIG. 4 shows the bridge resistors from $L_{0A}$ to $U_{xB}$(x=0, 1, 2, . . .) and $U_{0A}$ to $L_{xB}$ but there are similar connections (not shown) between $U_{1A}$ and $L_{1B}$.

In an ASIC/microprocessor context each of the resistors $RV_i$, $RG_i$, $RB_{ij}$ may be realized as a digitally adjustable resistor array. The resistor values are set to provide current recycling, whereby some of the current passing through a first two-terminal region (e.g., of a processor core) also passes through one or more additional two-terminal regions (series connected processor cores).

Figure 5:
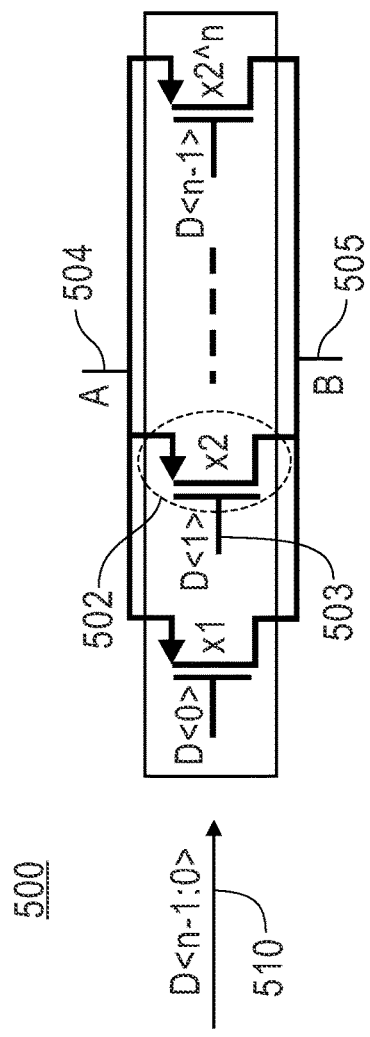
FIG. 5 shows an example, non-limiting embodiment of a programmable resistor that can be used as any tunable resistance device in the stacked multi-core systems of FIGS. 1-4.

FIG. 5 shows an example, non-limiting embodiment of a programmable resistor 500 that can be used as any tunable resistance device $RV_i$, $RG_i$, $RB_{ij}$ in the stacked multi-core systems 400, 450 of FIGS. 1-4. The programmable resistor 500 of FIG. 5 is configured as an array of parallel connected transistor devices 502 each of which can be a field effect transistor (e.g., p-FET) device having a gate input terminal 503 for receiving a digital voltage, e.g., corresponding to a bit value of 1 or 0. The programmable resistor 500 can receive an n-bit digital word 510 with each respective bit input to a respective gate terminal 503 of a respective transistor 502. Different input digital words D<n−1:0> can be controlled from a digital data signal source (not shown), each word of a value for controlling a current flow/resistance between resistor terminals 504, 505. For example, an eight bit value (e.g., n=8) of 00000000 can program a very low resistance, e.g., providing a short circuit, while an eight bit value of 11111111 can program a very high resistance value, e.g., an open circuit. Digital words having values in between can set the programmable resistor 500 to a target resistance value. Due to the closed-loop feedback configurations described herein, a plot of the resistance values as a function of digital code word values does not need to be linear, monotonicity is enough.

While use of linear resistive devices such as the one described in FIG. 5 is employed in a controllable current provision network (a resistive network of FIGS. 3, 4) including a combination of multiple current supplying devices connected to the supply/ground rails and to the processor cores. Current provision network can be implemented with active devices resulting in lower energy loss than linear resistive devices. For example, in alternate embodiment, the tunable resistance device 500 can be a current supplying device providing a varying amount of current, between a higher input voltage and lower output voltage, where the current/voltage characteristic of the device is controlled (either through active devices or tunable passive devices). In an embodiment, the current supplying device can be a tunable transistor device operating in a linear region behaving like resistors, or a variable controllable switching regulator with integrated magnetic elements such as a DC-DC buck converter or buck-boost switched inductor converter.

Figure 6:
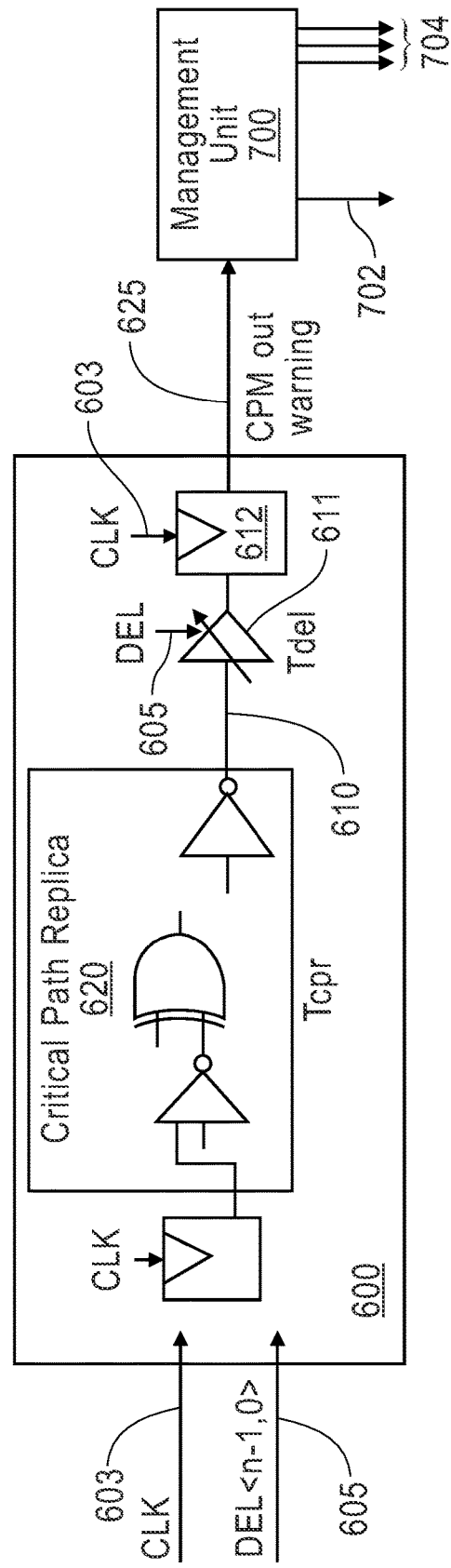
FIG. 6 depicts a conceptual illustration of a critical path monitor circuit that is employed in each processor core in the system embodiments of FIGS. 1-4.

In embodiments herein, a critical path monitoring technique is employed for monitoring the performance of a processor core for use in controlling the voltage/frequency scaling. In an ASIC/microprocessor context, as shown in FIG. 6, the state monitors are tunable critical path monitors. Referring to FIG. 6, there is depicted a conceptual illustration of a critical path monitor circuit that is employed in each processor core in the embodiments of FIGS. 1-4. In an embodiment, the Critical Path Monitor (CPM) 600 is an on-chip sensor that measures the timing margin available to circuits on the chip. CPM can be used to measure available timing margin dynamically and to adjust the operating voltage to maintain a fixed timing guardband (timing slack) determined during worst-case characterization. The resulting mechanism reduces power consumption for typical workloads, while still allowing worst-case workloads to operate at a maximum frequency.

At a respective core, a critical path monitor circuit 600 of FIG. 6 includes a critical path replica circuit or an in-situ monitor circuit 620. In an embodiment, a pulse is sent through the critical path replica circuit 620 that matches the delay of the real circuit critical path with an appended extra tunable delay 611, and then is captured by a flip flop device 612 clocked by receiving an input clock signal 603. The delay of the critical path replica (CPR) that matches the delay of the real circuit is set using an input digital delay signal 605. The CPM replica circuit 620 is configured to monitor the time margin of a critical path on the processor to indicate whether the processor core should be operated faster or slower. For example, the CPM output ($CPM_{out}$) is zero (0) if the Time delay of the CPR (Tcpr) plus the time delay of the tunable delay Tdel) is less than the time of arrival of the clock pulse (Tclk), i.e., $CPM_{out}=0$ if Tcpr+Tdel<Tclk. Similarly, $CPM_{out}=1$ if there is less than Tdel of margin between the critical path and the clock period. In an embodiment, the CPM replica circuit 620 employs a time-to-digital converter having a delay line that receives an input signal feed and flip-flop circuit 612 to sample the state of the delay line 610 at the arrival of another signal, e.g., the clock 603. In an embodiment, the time-to-digital converter is calibrated so that under nominal voltage the input signal always propagates to a middle of the delay line when the sampling signal arrives. When the system voltage is higher than the nominal voltage, the delay of the delay line is smaller and the input signal propagates further in the delay line, indicated by a right shift of the edge of the digital binary code. When the system voltage is lower than the nominal voltage, the delay of the delay line is larger and the input signal propagates shorter in the delay line, indicated by a left shift of the edge of the digital binary code. The processor can monitor the edge of the digital binary code and generate an output feedback control signal 625 for receipt at a power management control unit 700 that, in response to the feedback signal 625, can generate a signal 702 or generate signals 704 to tune one or more $RV_i$, $RG_i$, $Rb_{ij}$ resistances (i.e., to increase or decrease supply voltage) to better adapt to a system safe margin. In an embodiment, if it is detected that the core is running afoul of target setpoints (e.g., runs at a voltage and/or frequency approaching the edge of functionality), then the CPM output signal 625 can additionally comprise a warning message. In one implementation, the time to digital converter (TDC) of FIG. 6 includes a tapped delay line, e.g., consisting of one latch chain and one buffer chain. A start signal is given to the buffer chain and stop signal is given to the latch chain, and a delay of the latch chain and buffer chain is different, and a resolution of this difference depends on the difference of the delays between latch and buffer. Such a tapped delay line produces a multi-bit output, e.g., in the form of a thermometer word (e.g., 4=1111000000) from the TDC.

Figure 7:
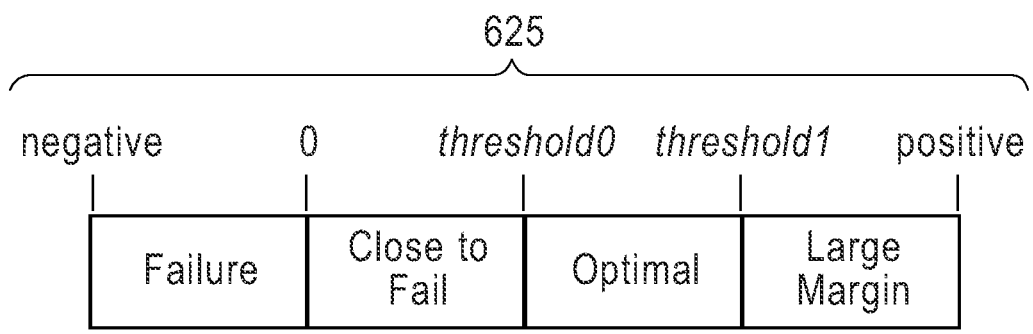
FIG. 7 depicts an exemplary CPM output signal which can be a digital code word indicating how close to a timing failure is the core operating.

FIG. 7 depicts the CPM output signal 625 which is a feedback control signal code, e.g., a digital word, indicating how close to a timing failure (how much timing slack) is the core operating. In an example, the output code can include an indication of a timing margin with different thresholds defined that associate a particular core timing margin issue. For example, a threshold of 0 represents a timing margin failure threshold such that anything below this value, i.e., a negative value (digital word) indicates a core failure. Any CPM determined core timing margin value above 0 but less than a first timing margin threshold (threshold0) can indicate a core operating close to failure; likewise, a CPM determined core timing margin value between the first timing margin threshold (threshold0) and a second timing margin threshold (threshold1) can indicate an optimal operating core, e.g., a stable functional core operation; a CPM determined positive core timing margin value above the second timing margin threshold (threshold1) can indicate a large operating timing margin. In an example implementation, one goal can be to operate the accelerators in the optimal range, e.g., threshold° can be defined as 5% of a clock period and threshold1 as 15% of a clock period. In alternate embodiments, the operating state of the cores are described as a set of values that are visited in sequence as the voltage across the core is decreased. For the example four-value case shown in FIG. 7, these values can be conceptualized as: 1) robust, i.e., un-necessarily large margin (not energy efficient), 2) Optimal, 3) close to failure, and 4) failing, where failing is equivalent to incorrect functionality of the core. In embodiment, feedback control system using power management unit and CPM monitors can operate to control resistors RV, RG in a bang-bang manner by the CPM 600, or continuously. The tunable bridge resistor RB are tested periodically to determine if it makes either of the two core domains retain their performance with less RV or RG.

In embodiments, the power management unit 700 monitors the operating state of the cores and, in response to these feedback signal values, issues a signal 704 to tune one or more $RV_i$, $RG_i$, $Rb_{ij}$ resistances (i.e., to increase or decrease supply voltage) that define the interconnections of the cores to each other and to the two power rails (Vdd and Vss) to better adapt to a system safe margin. In an example, optimization of all resistance values initiates from a stable starting point and is performed periodically or at command in order to decrease overall power consumption at a given time.

As will be described, the power management unit 700 has access to the reports from state monitors implemented at each of the processor cores and control all resistor values in the network to attain a desired operating state for all cores, e.g., a state that optimizes the operating frequency of a core to achieve a desired computational function with minimal power consumption. In an embodiment, the minimal power consumption is achieved by starting with minimal resistance values to each voltage rail terminal of each processor core and maximal bridge resistance values to the one more intermediate nodes (cores), and by subsequently increasing resistance to the rails and decreasing the resistance to the one or more intermediate nodes (core), as much as possible while maintaining the desired functional computation.

Figure 8:
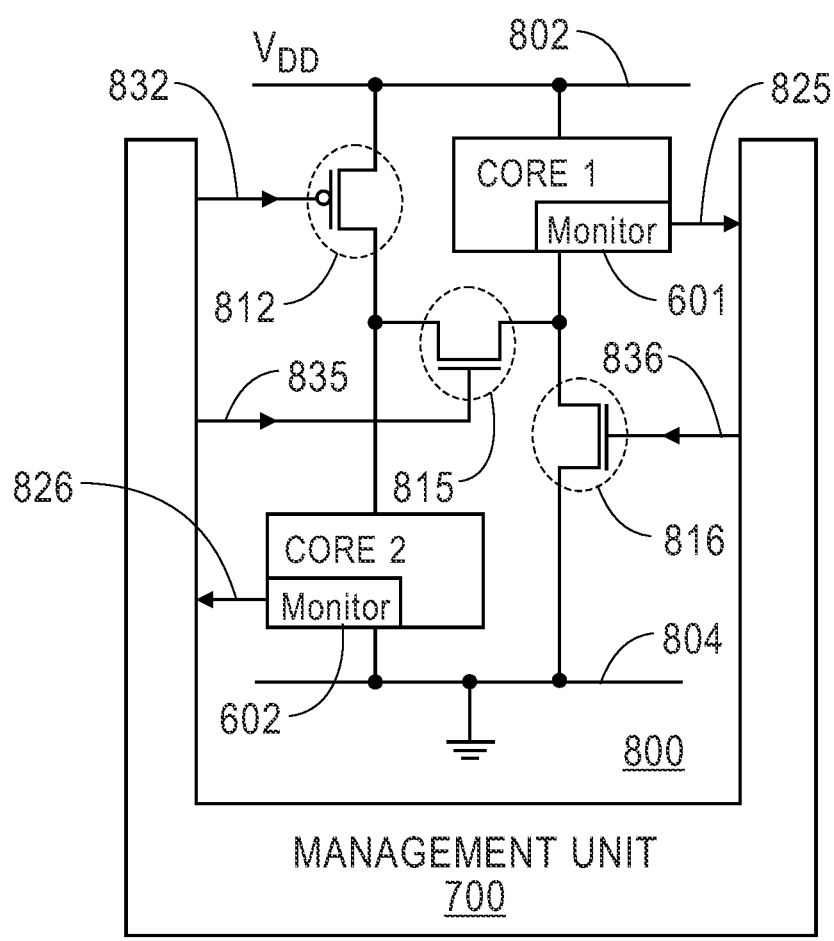
FIG. 8 depicts an embodiment of the stacked processor core circuit structure for optimized dynamic voltage and frequency scaling control corresponding to the circuit of FIG. 1.

FIG. 8 depicts an embodiment of an exemplary stacked processor core circuit structure 800 for optimized dynamic voltage and frequency scaling control corresponding to the circuit 100 of FIG. 1. In FIG. 8, the circuit 800 includes upper processor core (e.g., Core 1) including an associated CPM monitor 601 providing an output signal 825 for input to management unit 700 and a lower processor core circuit (e.g., Core 2) including an associated CPM monitor 602 providing an output signal 826 for input to management unit 700. In the circuit of FIG. 8, the tunable upper resistive device $RV_1$ is implemented as a FET transistor 812 having a first terminal connecting the power input voltage connector of the lower core (Core 2) and a second terminal connecting Vdd power voltage conductor 804; the tunable lower resistive device $RG_1$ is implemented as a FET transistor 816 having a first terminal connecting the ground connection of the upper core (Core 1) and a second terminal connecting ground reference potential conductor 804; and the tunable bridge resistive device $Rb_{12}$ implemented as a FET transistor 815 having a first terminal connecting the ground connection to the upper core (Core 1) and a second terminal connecting the power input voltage connection to the lower core (Core 2). In the embodiment of FIG. 8, management unit 700 receives upper core monitor signal 825 and lower core monitor signal 826 and given knowledge of the current voltages and core operating frequencies, implements logic for generating control signals to modify the resistance of one or more of the upper resistive device 812, lower resistive device 816 and tunable bridge resistive device 815. In particular, based on the logic run at the management unit 700, respective digital control signals 832, 835, 836 can be generated for input to respective gate terminals of FET devices 812, 815, 816 for tuning a resistive value of each according to a desired mode of operation, e.g., to achieve a target core operating frequency or voltage.

Figure 9:
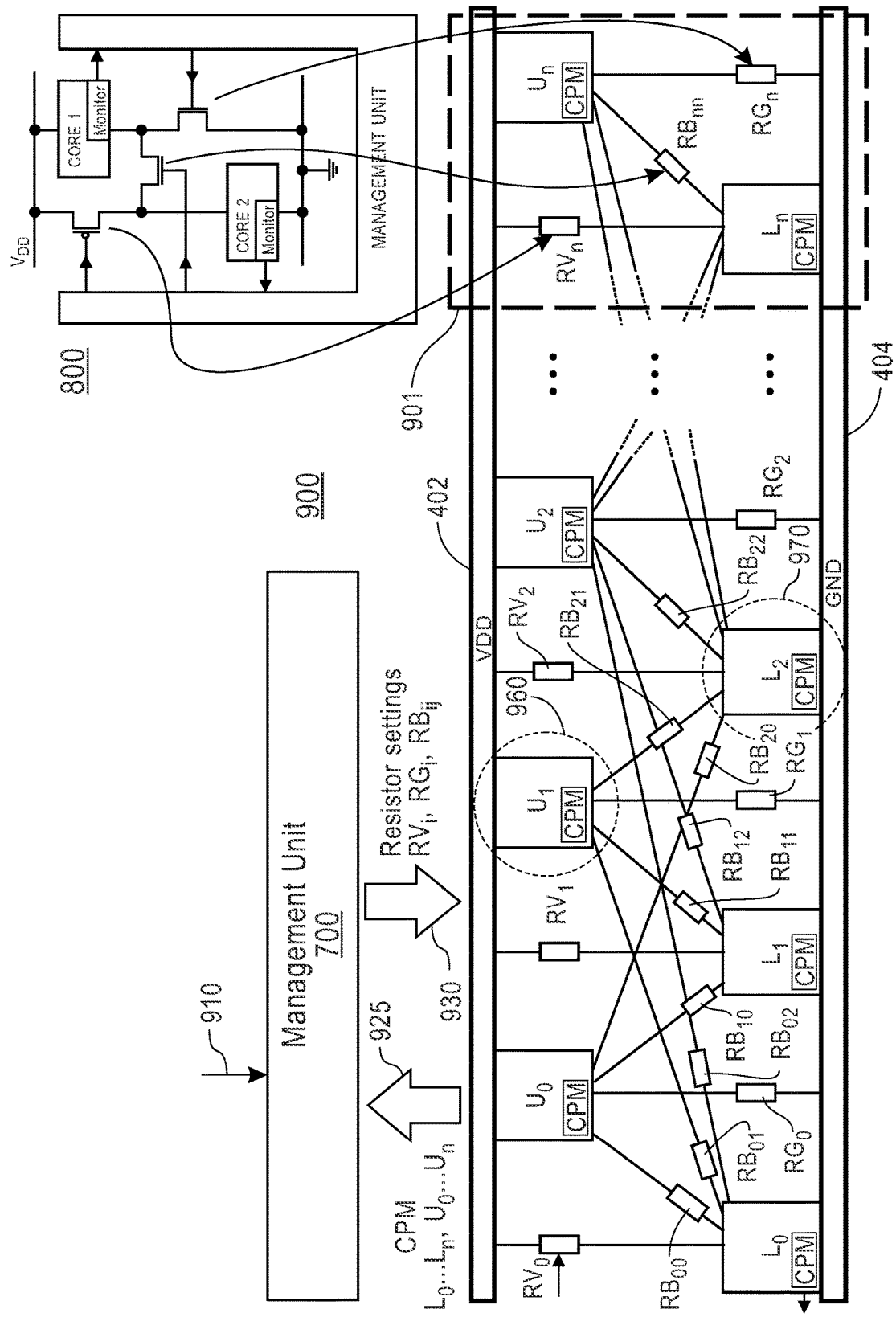
FIG. 9 depicts an embodiment of the reconfigurable stacked processor core circuit structure for optimized dynamic voltage and frequency scaling control corresponding to the circuit of FIG. 4.

FIG. 9 depicts an embodiment of the reconfigurable stacked processor core circuit structure 900 for optimized dynamic voltage and frequency scaling control corresponding to the circuit 400 of FIG. 4. FIG. 9 depicts a full realization of an interconnect system then includes the cores interconnected in the resistive network, together with per-core state monitors and the management unit 700. The full realization is an interconnection of repeating unit blocks 901 (with one block 901 shown) that corresponds to the stacked processor core circuit 800 of FIG. 8. In the embodiment depicted, each unit block 901 includes an upper processor core (e.g., Core $U_i$, i=0, 1, 2, ..., n) including an associated CPM monitor circuit providing monitor output signal for input to management unit 700; a lower processor core circuit (e.g., Core $L_i$, i=0, 1, 2, ..., n) including an associated CPM monitor circuit providing monitor output signal for input to management unit 700; and includes tunable upper resistive device $RV_i$, tunable lower resistive device $RG_i$ and tunable bridge resistive device $RB_{ij}$, each implemented as respective FET devices in the manner shown in FIG. 8, where i=0, 1, 2, ..., n and j=0, 1, 2, ..., n. For example, in the circuit 900 of FIG. 9, unit block 901 includes upper core $U_n$, lower core $L_n$ and tunable upper resistive device $RV_n$, tunable lower resistive device $RG_n$ and tunable bridge resistive device $RB_{nn}$. The electrical network of processing elements and resistive elements shown in FIG. 9 may span a single silicon die or expand across a multi-die framework.

In an embodiment, the logic and methods implemented by management unit 700 revolve around granular sensing for functional correctness using, e.g., critical path timing in the replica circuits embedded in each processing core and actuating the controllable resistive elements $RV_i$, $RG_i$, $RB_{ij}$ to minimize power consumption while maximizing functional on-time for all cores. The interconnection between the management unit 700 to each CPM set in each core and to each resistor is not individually depicted.

In the embodiment of FIG. 9, management unit 700 receives an input signal(s) 910 indicating the target frequency of operation of each core. Each core has a set of critical path monitors (CPM) that generates a warning(s) 925 if the core is approaching the edge of functionality. The management unit 700 implements logic for processing those warnings to set the value(s) 930 of the different resistors $RV_i$, $RG_i$, $RB_{ij}$ (e.g., to values between 0 and ∞). For example, in an implementation using the frequency of operation to actuate meaningful feedback, the power management unit 700 monitors the operating state of the cores and controls the resistive device values that define the interconnections of the cores to each other and to the two power rails. The operating state of the cores are described as a set of values that are visited in sequence as the voltage across the core is decreased. Different algorithms may call for a different set of values in the output set of the implemented state monitor. In an embodiment, with respect to the unit blocks 401, 901, there are 5 major static modes of operation with these two cores:

Mode 1: full supply parallel, with RBRIDGE set as high as possible to mimic an open circuit (infinite ohms) and RHEAD and RFOOT set as low as possible (e.g., 0 ohms) to mimic a short circuit. The voltage across both cores is VDD (i.e., both cores see the full supply rail voltage) and operate fully in parallel, and minimal current flows in RBRIDGE, decoupling the cores. This mode is optimized for weak scaling problems that require operation at maximum speed.

Mode 2: independent core regulation, with RBRIDGE set as high as possible (e.g., infinite ohms), and RFOOT and RHEAD are increased to achieve a certain frequency of operation in respective cores 1 and 2. This implements dynamic voltage/frequency scaling on a per-core level though linear regulation. The choice of RFOOT and RHEAD resistance values may be determined by tracking the realized critical path delay using the replica monitor. The drive of RFOOT and RHEAD can then be controlled in a simple feedback loop to force the critical path delay and hence the frequency of operation to an externally set target. Core 1 and Core 2 still operate in parallel but at a different voltage.

Mode 3: core-core regulation with RBRIDGE as low as possible (e.g., 0 ohms). The majority of the current in this mode should flow through the functional stack, i.e., through the two cores in series, thus effecting current recycling while still allowing both cores to be operating efficiently on the DVFS curve. This mode is ideally used when the external frequency requirements of core 1 and core 2 are commensurate such that they may be used to regulate each other. RHEAD and RFOOT are then set to effective open circuits (e.g., infinite ohms). Through this current recycling, voltage regulation of each core is achieved with no extra loss and the computational efficiency is maximized, appropriate for problems demonstrating strong scaling. Note that in the case where there is an imbalance between the cores' frequency requirements that would otherwise preclude the use of core-core regulation, RHEAD or RFOOT can be set to a value that sources/sinks additional current into the core demanding more power so that the efficiency gain of the current recycling in the weak core may still be realized. Software-level awareness of the state of RHEAD and RFOOT may be used to implement a feedback loop that shifts activity levels of cores 1 and 2 to minimize the additional current that needs to be source/sunk by RHEAD or RFOOT. As an example, in this mode, a reduced voltage seen by Core 1 and Core 2 is achieved by increasing the tunable bridge resistance to a larger value, such that, given a voltage power supply Vdd of 1 volts, each core can see ⅓ Volt, e.g., where, as shown in FIG. 1, the voltage at the power supply terminal connection 122 of core 2 is ⅓ volts while the voltage at the ground terminal connection of 126 of Core 1 is ⅔ volts.

Mode 4: low-voltage state retention, where RHEAD and RFOOT are set to act as open circuits (infinite ohms) and RBRIDGE is set to an intermediate value (>0 ohms) such that the stack leakage current flows through core 1, RBRIDGE, and core 2 as in mode 3. Here, though, RBRIDGE is chosen such that the leakage current develops a sizable voltage drop across it, decreasing the voltages across each core. This has the effect of allowing a DVFS mode wherein the voltage of each core is set to minimize the leakage current while still allowing state retention/basic functionality in the stateful elements of the core. In particular, this makes the use of high-performance ultra-low threshold-voltage transistors in either core more tenable, as it provides a pathway for mitigating the higher leakage current associated with these devices.

Mode 5: full power gating, wherein all resistors are set to their maximum value (e.g., infinite ohms) such that the voltage across either core is close to zero, used when the cores are computationally idle, e.g., no current flowing through the cores.

Referring back to FIGS. 4 and 9 depicting the respective reconfigurable stacked processor core circuit systems 400, 900 for optimized dynamic voltage and frequency scaling control having a plurality of 'upper' and 'lower' cores that can be interconnected in flexible sets 401, 901, in such a situation, some set of n lower cores may be connected to k upper cores through potentially distinct RBRIDGE resistive devices to achieve maximal current recycling, as in Modes 3 and 4 above. Each lower core has an RHEAD associated with it, and each upper core has an RFOOT that allows for additional flexibility in defining additional current source/sink paths, as in Mode 2 above.

In such systems with complex interconnections, most, if not all of the processor cores operate in a mode analogous to Mode 3, where cores participate in regulation of each other. In this way, current recycling across the processing units is maximized.

Figure 10A:
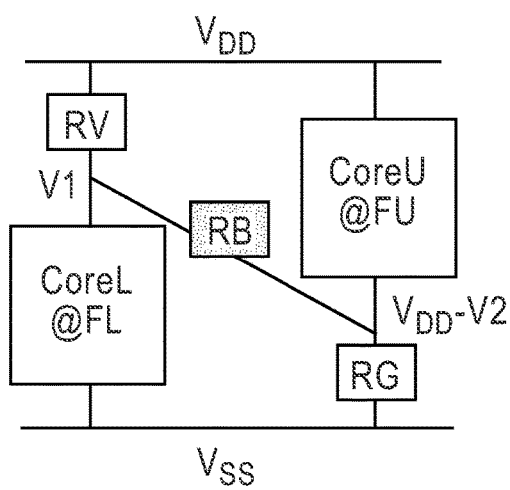
FIG. 10A depicts an example result of a circuit pairing step which includes a selecting of two candidate circuits (cores) of a unit block with a bridge resistance set to its maximum (open circuit) value.
Figure 10B:
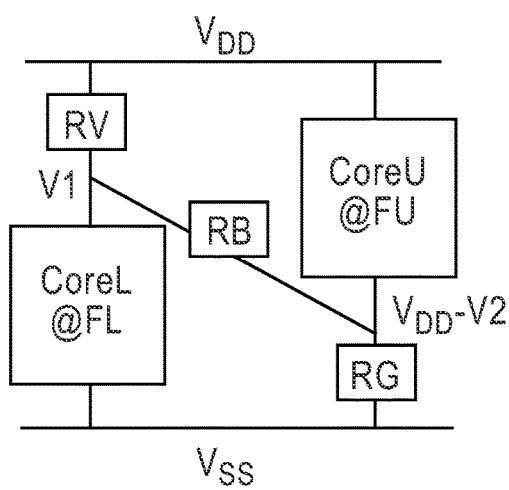
FIG. 10B depicts an example result of a circuit pairing step which includes gradually decreasing, from its maximum value, the resistance of the tunable bridge resistive device RB to initiate current flow through the tunable bridge resistor RB connection which will decrease voltages across each paired cores.
Figure 10C:
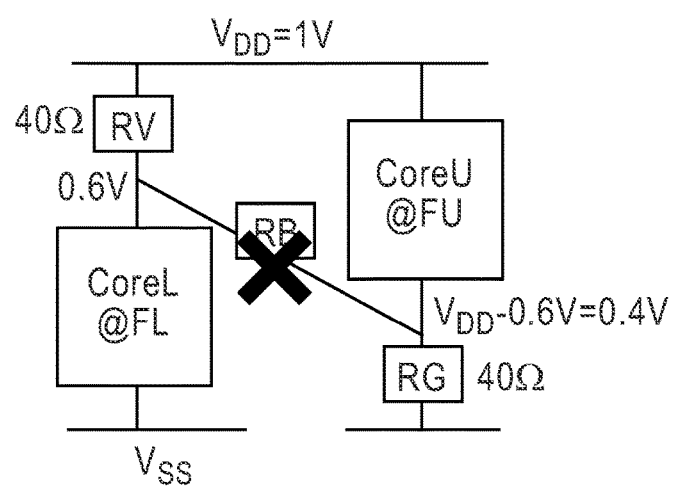
FIG. 10C depicts an example result of operating states illustrative of a non-optimal case when a tunable bridge resistance is connected and the voltage across each of the paired operating cores drop below require limits.
Figures 10D, 10E:
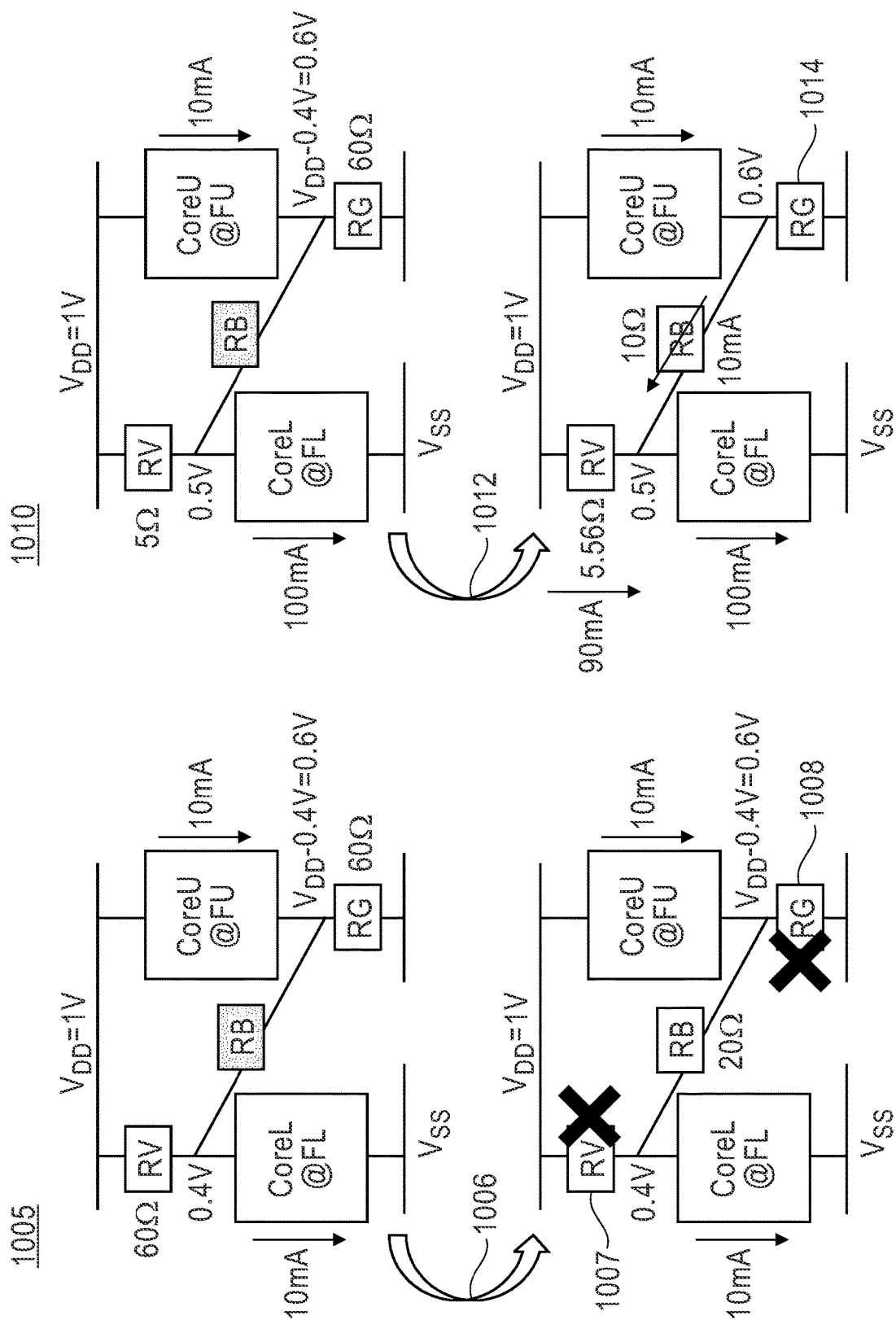
FIG. 10D depicts a further example scenario for adjusting RB, RV and RG to a point where there occurs a functional failure in the cores.
FIG. 10E depicts a further example scenario depicting a connection of one upper and one lower core when their current consumption do not match.

The following FIGS. 10A-10E depict an illustrative example of the use of feedback in a two-core embodiment in action. FIGS. 10A-10D implements a use case of the pairing steps when both cores consume the same current, e.g., 10 mA, while FIG. 10E illustrates the pairing of two cores when their consumption is different (e.g., 10 mA and 100 mA respectively).

In FIG. 10A, there is depicted a result of a circuit pairing step 1000 which includes a selecting of two candidate circuits (cores) of a unit block, e.g., lower core CoreL to be operated at a target clock frequency FL, upper core CoreU to be operated at a target clock frequency FU, and associated head resistances RV, tunable bridge resistance RB and lower foot resistance RG of a unit block 401, 901 from the stacked unit block circuits of FIGS. 4, 9. Alternately, as shown in FIG. 9, any pair of connected cores can be selected such as an upper core 960 (core $U_1$) and lower core 970 (core $L_2$) with associated resistive devices to be tuned, e.g., lower resistive device $RG_1$, upper resistive device $RV_2$ and bridge resistive device $RB_{21}$.

After selecting cores, as shown in FIG. 10A, the stacked circuit connection are placed in Mode 2 operation by setting tunable bridge resistance RB to its maximum value (e.g., infinite ohms) and RV and RG are each set to their highest value that does not result in a functional failure within a predetermined margin, given target operating clock frequencies FL and FU and a given operational margin. As a result of the setting of RV and RG to higher values that achieve their respective operating frequencies, there is a voltage V1 created across CoreL and a voltage V2 created across CoreU. A voltage Vdd-V2 is depicted across lower resistive device RG. This mode corresponds to Mode 2 operation.

Transitioning the stacked circuit connection to Mode 3 operation, FIG. 10B depicts a result of a step 1001 which includes gradually decreasing, from its maximum value, the resistance of the tunable bridge resistive device RB. Given a current first operating state dependent upon the current set RV, RG values: 1) V1>VDD−V2: then as a result of the decreasing the tunable bridge resistance, current flows through the tunable bridge resistor RB connection which will decrease V1 and V2 and will result in state CPM monitors reporting an issue, as there is not have enough voltage headroom for bridging (V1+V2>VDD).

Alternatively, given a current second operating state dependent upon the current set RV, RG values: 2) V1<VDD−V2: then as a result of the decreasing the tunable bridge resistance, current flows through the tunable bridge resistor RB connection which will decrease V1 and V2, which will not result in functional failure, even if RB is set to its minimum value. In this case 2 scenario, if RB=0, then V1+V2=VDD. Thus, the management unit 700 can increase RG which increases V1 and decreases V2. Once V2 drops too low and the state monitor issues a warning, the power management unit 700 increase RV to increase V2 and decrease V1. The alternate increasing of RG and RV until one or both is at maximum.

If both RG and RV attain maximum values without any warnings about functional failure, then management unit 700 can increase the resistance value of RB, which decreases both V1 and V2, until either CoreU or CoreL's state monitor reports a problem.

FIG. 10C depicts a result of operating states 1002 illustrative of a non-optimal case when a tunable bridge resistance is connected and the voltage across each of the paired operating cores drop below require limits. In FIG. 10C, it is the case that both CoreL and CoreU need 0.6 V and 10 mA to run robustly and Vdd is assumed as 1 Volts. So RV=RG=40 Ω at the edge of robust functionality. Once the tunable resistive device RB connects, both V1 and V2 drop below the required limit and the state monitors issue warnings. Thus, power management unit 700 performs no bridging.

FIG. 10D depicts a further example scenario 1005 for adjusting RB, RV and RG to a point where there occurs a functional failure in the cores. In the paired cores circuit stack of FIG. 10D, initially it is the case that both lower core CoreL and upper core CoreU need 0.4 V and 10 mA to run robustly. Then, as shown in FIG. 10D, given a Vdd of 1 Volt, then RV=RG=60 Ω at the edge of robust functionality.

In the example of FIG. 10D, as power management unit decreases RB below maximum, V1 and V2 start to increase, to reach 0.5 V each. Once RB reaches minimum resistance, e.g., 0 Ω, the power management unit at 1006 starts to increase RV and RG, up to their maximal values as shown at FIG. 10D where RV and RG result in open circuits 1007, 1008. There are still no violations, even in the limit of arbitrarily high resistances RV and RG.

Then, continuing as shown in FIG. 10D, to transition to Mode 4 operation, the management unit then increases tunable resistance RB value. As there is 10 mA through RB, once RB>20 Ω there is >0.2 V drop through it, and both V1<0.4V, V2<0.4V, at which point the state CPM monitors indicate a functional failure.

FIG. 10E depicts a further example scenario 1010 indicating a possibility for connecting two cores with unequal power consumption as well as additional devices in parallel to the upper core (CoreU) to take advantage of excess current that is not being recycled. In the paired cores circuit stack of FIG. 10E, initially it is the case that lower CoreL needs 0.5 V and 100 mA to operate and upper CoreU needs 0.4 V and 10 mA to operate. As shown in FIG. 10E, given a Vdd of 1 Volt, then RL=5 Ω and RU=60 Ω at the edge of robust functionality. In the example of FIG. 10E, as power management unit 700 decreases the value of RB from its maximum (e.g., open circuit), V1 and V2 start to increase, to reach 0.51 V each with no functional consequence. Once RB reaches minimum resistance, e.g., RB=0 ohms, the management unit starts to increase RV and RG at 1012. Once RG is at maximum (e.g., open circuit) at 1014 and RV=5.56 Ω (0.5 V drop for 90 mA current operation) the system cannot increase RV any further. As V1=0.5V, the management unit can increase again RB until V2=0.4V. It is noted that unlike in the other cases depicted in FIGS. 10A-10D, RV<∞, hence additional devices can be connected in parallel to CoreU to take advantage of the 90 mA of current that is not being recycled.

FIGS. 11A-11E are flow charts depicting the logic employed at the power management unit 700 for heuristic control of more than two processor cores for achieving stable operation. These methods can be employed at least during start-up. However, in a high-performance system, the resistance values of the interconnecting elements may be periodically updated to reclaim power/performance margin, and/or have an update forced. A forced update may accompany, for instance, a pre-determined core shutdown event, which would change the balance of current flow in the overall network. If speculation on load-vs.-time is available, updates could be forced when a load step is expected. On a very granular timescale, functionality such as per-core dynamic frequency scaling is also enabled in a straightforward manner through adjustment of the absolute values of the state thresholds in the power management system. The methods of FIGS. 11A-11E can be applied in the case where there is one upper core connected to multiple lower cores, however each of the lower cores is only connected to one upper core. A symmetrical embodiment can also be devised to support the case where there is one lower core connected to multiple upper cores while each of the upper cores is only connected to one lower core.

Figure 11A:
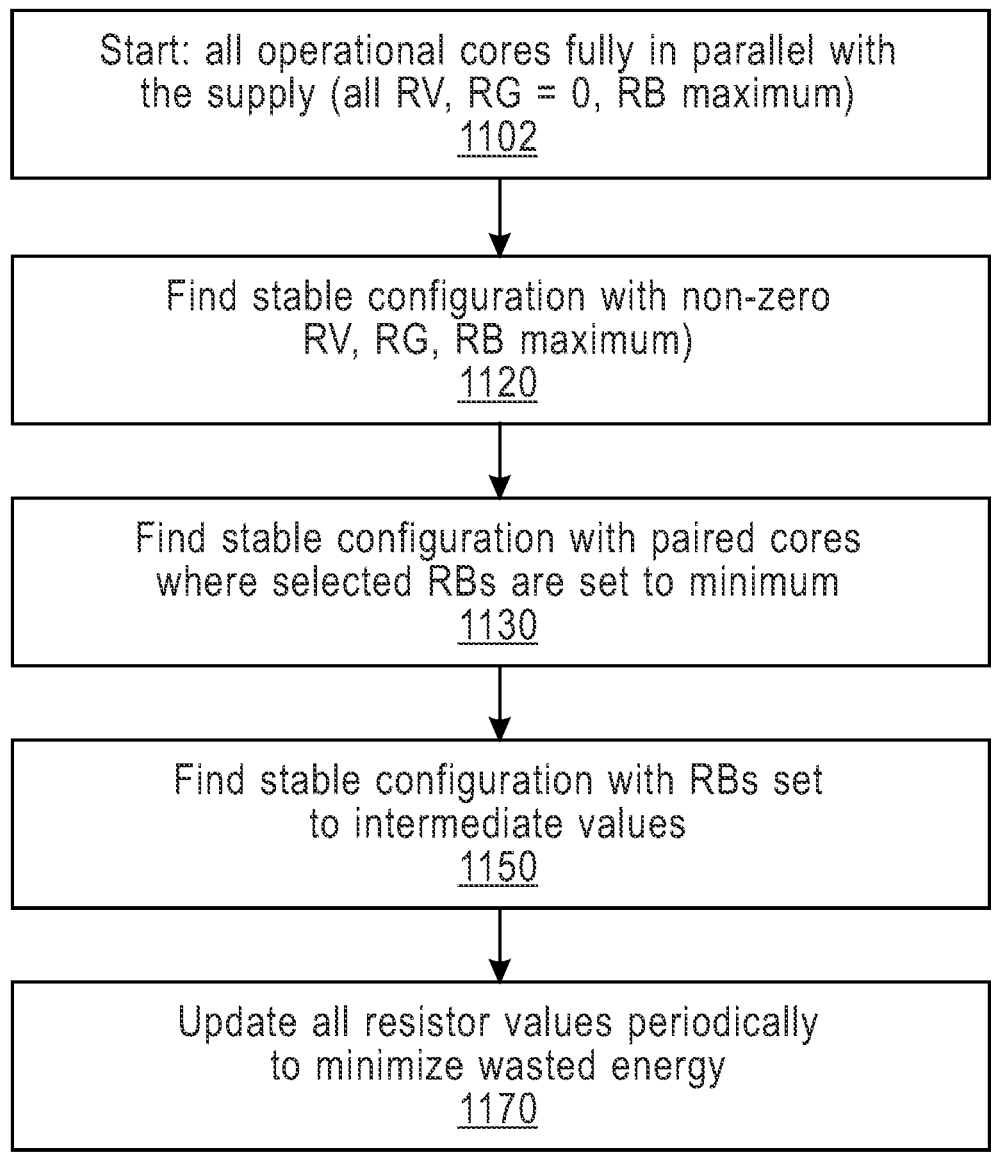
FIGS. 11A-11E are flow charts depicting the logic employed at the power management unit for heuristic control of two or more processor cores for achieving stable processor core operation in an embodiment.

FIG. 11A is a flow chart depicting an exemplary high-level method 1100 including steps shown in succeeding FIGS. 11B-11E implemented at the power management unit 700 for a two-core embodiment. In a first step 1102, an initialization step is performed that programs all processor cores to operate fully in parallel with the Vdd power supply voltage such as by setting all RV=0 and RG=0 and setting RB to its maximum value (infinite ohms). Then, after initialization, at 1120, steps are taken to find stable power supply resistance settings with non-zero values of RV, RG and while keeping RB set to its maximum value.

Figure 11B:
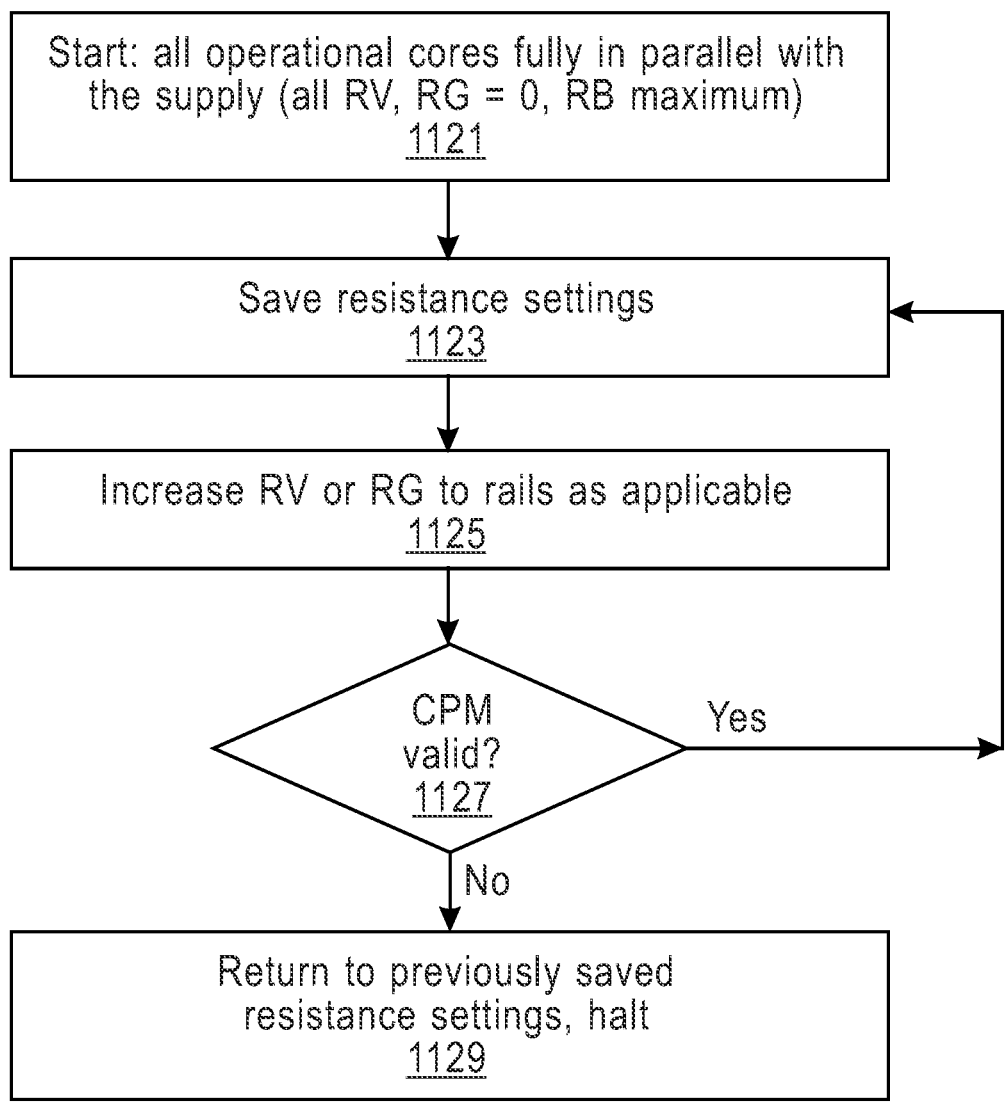

FIG. 11B shows a detailed embodiment of the steps for finding a stable configuration that includes setting the power supply resistances with non-zero RV, RG values at step 1120 of FIG. 11A. In FIG. 11B, at 1121, the finding of a stable configuration initialization includes setting all operational cores fully in parallel with the supply (all RV, RG=0, RB set to maximum). Then, at 1123, these resistance value settings are saved in a memory storage device, e.g., associated with the power management unit 700. Then, at 1125, the values of RV and/or RG are incrementally increased toward the rails (Vdd voltage) as applicable. At 1127, a determination is made as to whether any core CPM has issued a warning, or otherwise determines whether the CPM indicates valid core operations. If the CPM is still valid (critical path replica not providing a warning message and the system does not appear to be changing), then the process returns to 1123 to record the latest RV and/or RG and again the values of RV or RG are incrementally increased at 1125. These steps 1123-1127 are performed until a core exhibits an edge of functionality by receiving a CPM invalid warning from a core's CPM monitor indicating a timing violation, e.g., a close to fail output. At such time the power management unit receives the CPM invalid warning, then at 1129, the method returns to set the last previously saved resistance settings, and no more resistance tuning is performed and the method halts.

Returning to FIG. 11A, after finding a stable configuration that includes setting the power supply resistances with non-zero RV, RG values, the process proceeds to step 1130 to find a stable configuration with paired cores where selected tunable bridge resistances RB s are set to a minimum (e.g., short circuit). Details of this step is shown at FIG. 11C where there is performed the pairing of cores, assuming all resistive devices are all open.

Figure 11C:
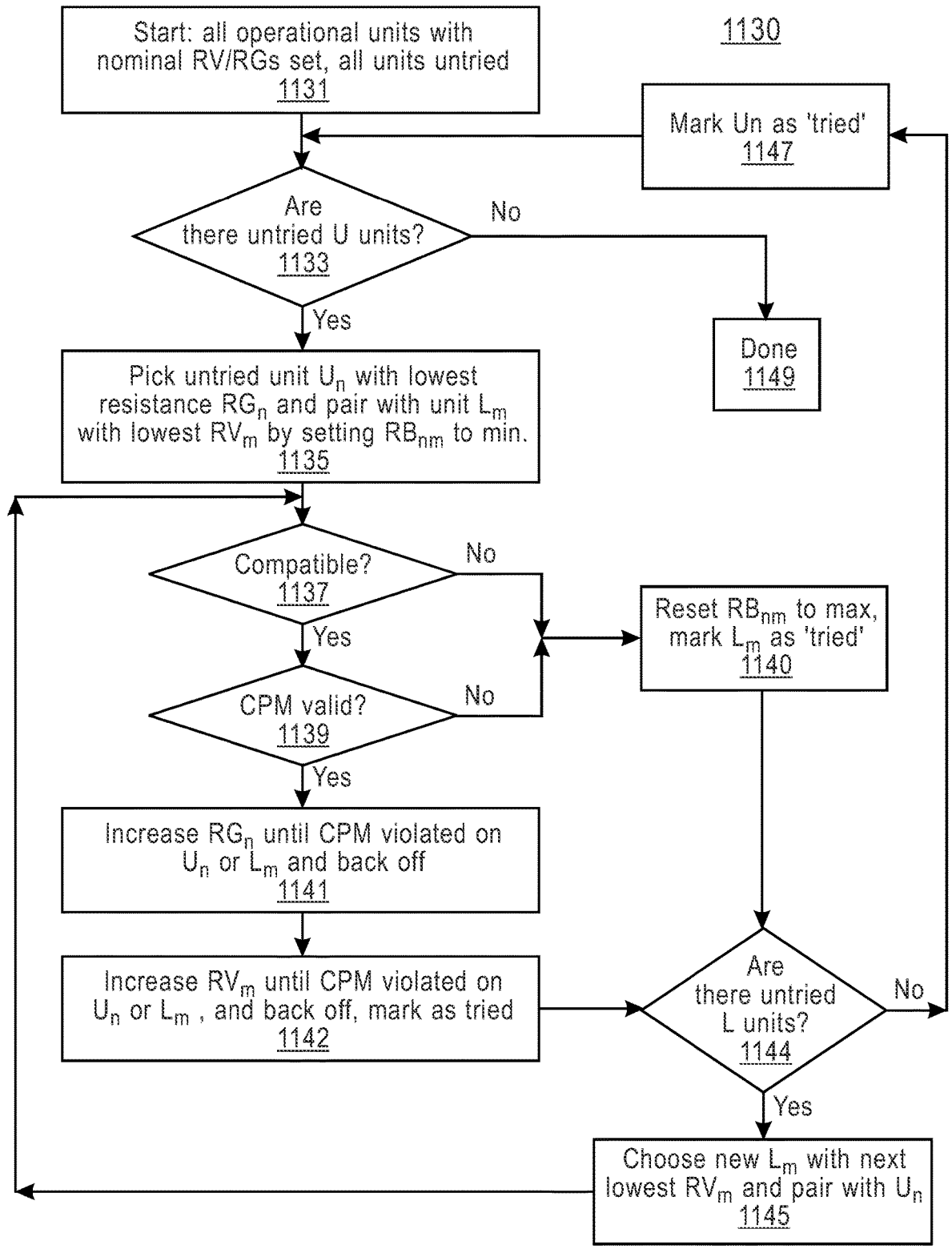

FIG. 11C shows a detailed embodiment of the method steps for pairing processor cores assuming resistors are all open at the start of step 1130 of FIG. 11A. In FIG. 11C, at 1131, an initial starting step includes setting all operational units with nominal RV/RGs values (from step 1120), and all units (cores) untried. Then, at 1133, a determination is made as to whether there are any untried upper units (U). If there are no more untried upper (U) units, the process proceeds to 1149 and the process ends. Otherwise, if there are untried units remaining, the process proceeds to 1135 where the system selects an untried unit $U_n$ with lowest resistance $RG_n$ and pairs this with a unit $L_m$ with lowest $RV_m$ by setting $RB_{nm}$ to a minimum value (e.g., 0 or negligible ohms). Then, a threshold determination is made at 1137 to determine if this current pair is compatible in the first instance (i.e., does the physical connection makes sense, for example, if two cores are not meant to be connected due to excessive power consumption). If this pairing is compatible, the process proceeds to 1139 where a determination is made as to whether the CPM of these cores have issued a warning indicating a core's exceeding the edge of functionality. If, at 1137, upon determining that the pair does not meet a threshold determination of compatibility or if, at 1139, the CPM issues an invalidity warning indicating improper operation, the method proceeds to step 1140 where, in response, the system resets the tunable bridge resistive device $RB_{nm}$ to its maximum, and mark the lower core $L_m$ as being 'tried'. Continuing to 1144, a determination is next made as to whether there are any untried lower processor core (L) units remaining. If there is no lower processor core (L) unit remaining, the process proceeds to 1147 where the current upper core $U_n$ is marked as tried and the process returns to step 1133 where the method steps are repeated. Otherwise, at 1144, if there are lower processor core (L) units remaining, the process proceeds to 1145 where the system selects a new lower processor core $L_m$ with next lowest $RV_m$ and this becomes paired with $U_n$. Then, the process returns to step 1137 to again perform and run steps 1137 et seq.

Returning to step 1137, FIG. 11C, if it is determined that the current pairing of unit $U_n$ with lowest resistance $RG_n$ and unit $L_m$ with lowest $RV_m$ by setting $RB_{nm}$ meet a threshold compatibility level, and if it is determined at 1139 that no CPM of a paired processor core issues an invalidity warning, then the process proceeds to 1141 to increase the resistance value of $RG_n$ until a CPM is violated on $U_n$ or $L_m$ and then back off that resistance value to a prior value where CPM does not indicate a violated state. The process then proceeds to 1142 where the system increases the $RV_m$ resistance value until CPM is violated on $U_n$ or $L_m$, and then back off that resistance value to a prior value where CPM does not indicate a violated state and mark this core as tried. Then the process proceeds directly to 1144, FIG. 11C to repeat the determination at 1144 as to whether there are any untried lower processor core (L) units remaining and steps 1145, 1147 are repeated based on the determination at step 1144.

Returning to FIG. 11A, after finding a stable configuration that includes paired cores with selected tunable bridge resistance RB values set to a minimum, the process proceeds to step 1150 to find a stable configuration with tunable bridge resistances RBs set to intermediate values to a state just below a failure point which is a most energy efficient core operating point. Details of the step to find a stable configuration that includes paired cores with selected RB values set to intermediate values is shown at FIG. 11D where there is performed the setting of the bridge resistances.

Figure 11D:
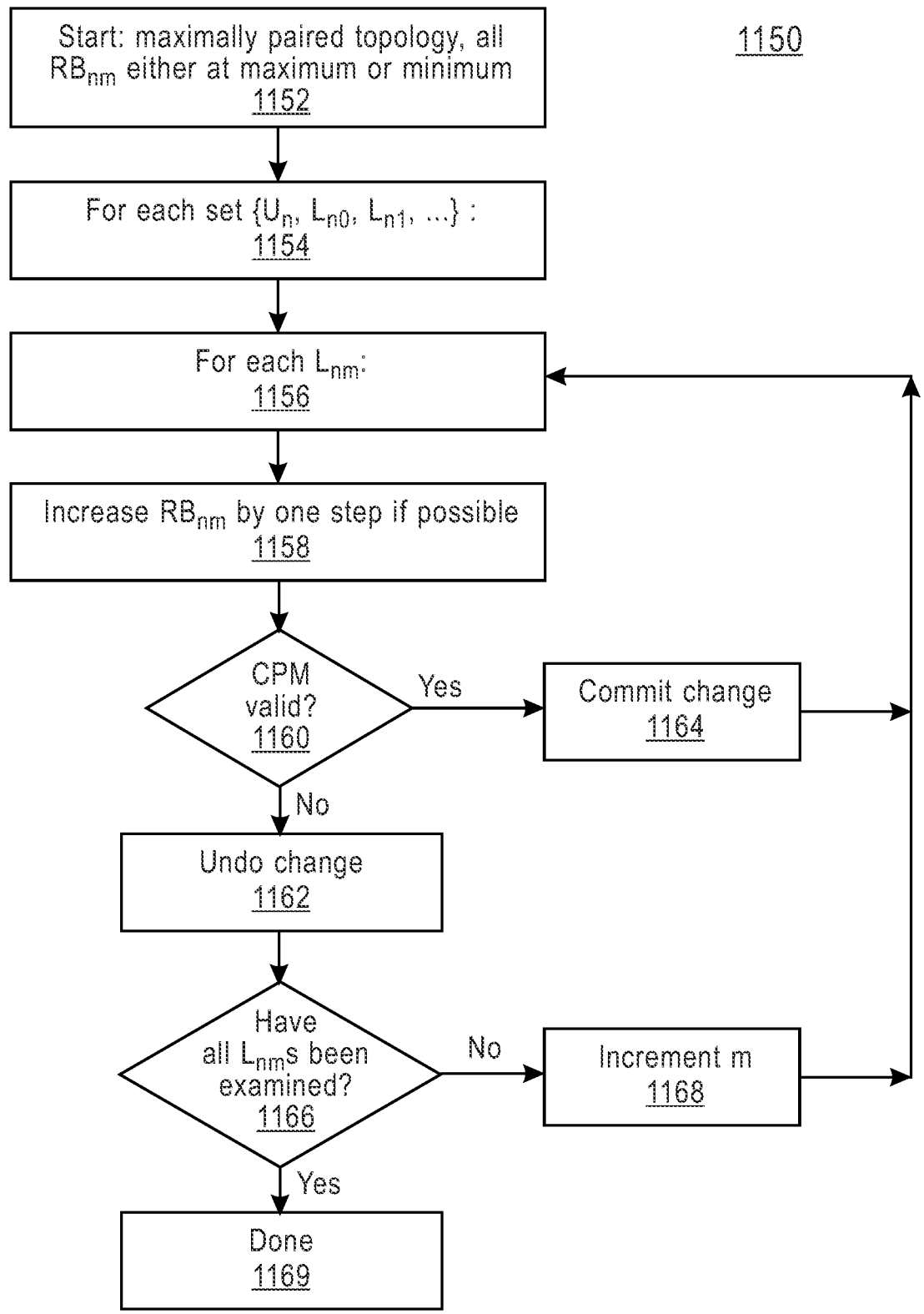

FIG. 11D shows a detailed embodiment of a method including the steps for setting the bridge resistances at step 1150 of FIG. 11A. In FIG. 11D, at 1152, an initial step includes starting with the maximally paired topology having all tunable bridge resistances $RB_{nm}$ set to either a maximum or minimum. Then, at 1154, for each pair/set (e.g., $U_n$, $L_{n0}$, $L_{n1}$, . . . , etc.) and at 1156, for each $L_{nm}$ of the set there is performed: at 1158, the system increases the tunable bridge resistance $RB_{nm}$ by one step (increment) if possible. Then, at 1160, a determination is made as to whether the CPMs of these paired cores have issued a warning indicating a core's exceeding the edge of functionality, i.e., whether CPM indicates an invalidity (e.g. "close to fail" output as depicted before in FIG. 7). That is, the method attempts to stop before the core reaches a failing point since, at that point, the core would need to be reset. If at 1160, it is determined that no CPM of a processor core has issued an invalidity warning the process proceeds to 1164 where the system commits the increased tunable bridge resistance change of $RB_{nm}$ and the process returns to step 1156 where the steps 1158 and 1160 are repeated to increase the same tunable bridge resistance $RB_{nm}$ value. If, at 1160, there is a determination made that a CPM of a paired processor core does issue an invalidity warning due to the increase of the paired cores' tunable bridge resistance $RB_{nm}$, then the process proceeds to 1162 where the system undoes the most recent tunable bridge resistance $RB_{nm}$ change (i.e., returning to the last valid setting) and the process proceeds to 1166. At 1166, a determination has been made as to whether all $L_{nm}$'s have been examined. If not all $L_{nm}$'s have been examined and there remains an $L_{nm}$ for the paired core $U_n$, then the process proceeds to 1168 where the index "m" is incremented to m+1 and the process proceeds to 1156 to repeat steps 1158 and 1160 for increasing the tunable bridge resistive device $RB_{nm+1}$ of the next $L_{n(m+1)}$. Step 1158 is then repeated to increase tunable bridge resistance change of $RB_{n(m+1)}$ and the system determines whether the CPM has issued an invalidity warning message in which case the process proceeds to either steps 1162 or 1164 to either undo the recent tunable bridge resistance change of $RB_{n(m+1)}$ or commit the increase change of the recent tunable bridge resistance change of $RB_{n(m+1)}$ and the process repeats the increasing of the $RB_{n(m+1)}$ until such time a CPM invalidity warning is issued. At such time, the process will again make the determination at 1166 whether all $L_{nm}$ has been evaluated and if not, increments the value of "m" and evaluates the next $L_{n(m+2)}$ for the current $U_n$. The repetition of steps 1156 through 1168 are repeated until such time at step 1166 that a determination is made that all $L_{nm}$ for the current $U_n$ have been examined at which time the process terminations at 1169.

Returning to FIG. 11A, after setting tunable bridge resistance RB values for each paired processor core set, the process proceeds to step 1170 for updating all tunable bridge resistances RBs values periodically to minimize wasted energy. Details of the step to update all tunable bridge resistances RBs values periodically to avoid wasted energy is shown at FIG. 11E where there is performed the setting of updating/monitoring the bridge resistances.

Figure 11E:
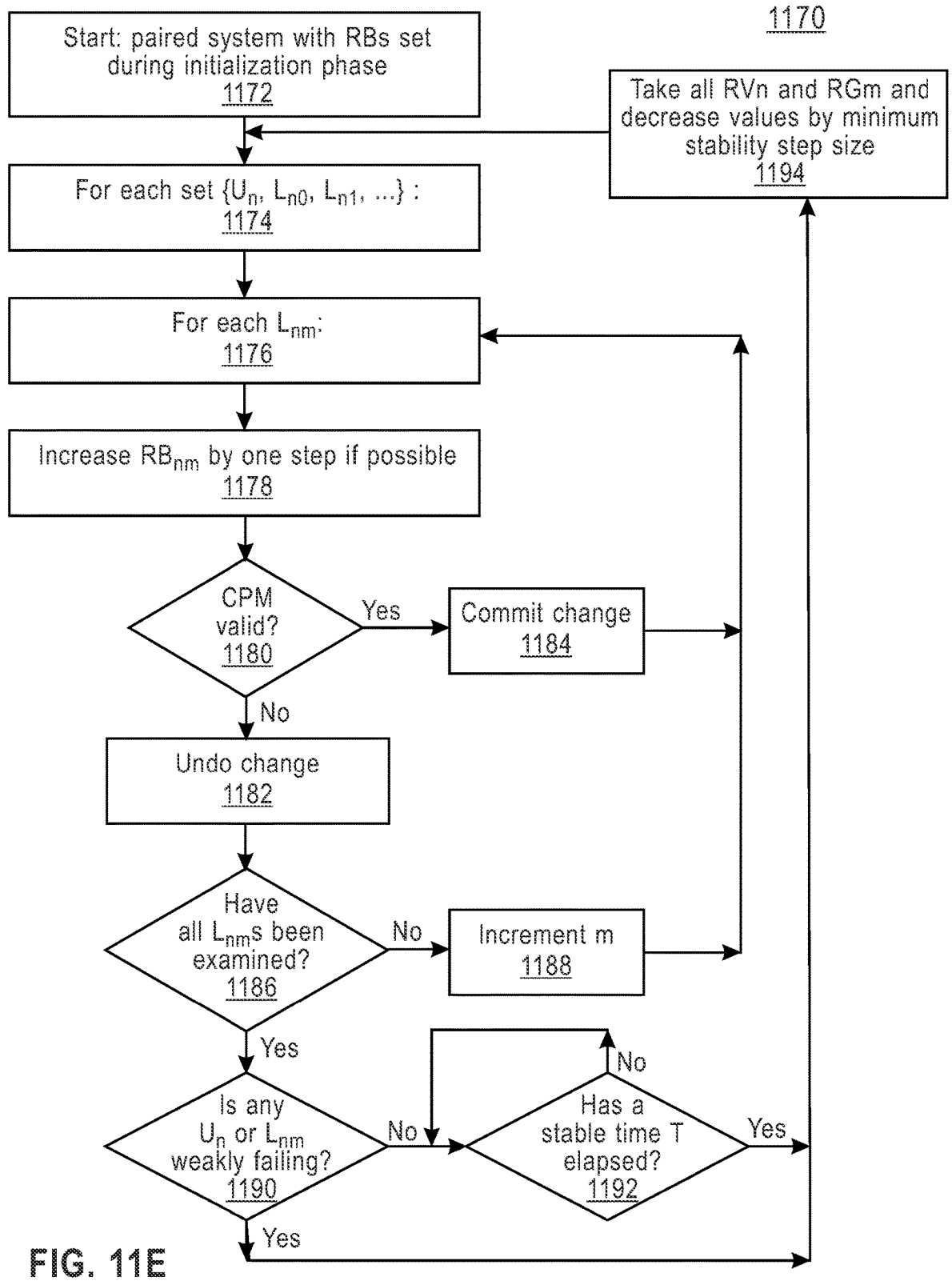

FIG. 11E shows a detailed embodiment of the method 1170 including the steps for updating/monitoring the bridge resistances. In FIG. 11E, at 1172, an initial step includes starting with the paired system with RBs set to their intermediate values. Then, at 1174, for each pair/set (e.g., $U_n$, $L_{n0}, L_{n1}$, . . . , etc.) and at 1176, for each $L_{nm}$ of the set there is performed: at 1178, the system increases the corresponding tunable bridge resistance $RB_{nm}$ by one step (increment) if possible. Then, at 1180, a determination is made as to whether the CPMs of these paired cores have issued a warning indicating a core's exceeding the edge of functionality, i.e., whether CPM indicates an invalidity. If at 1180, it is determined that no CPM of a processor core has issued an invalidity warning, the process proceeds to 1184 where the system commits the increased tunable bridge resistance change of $RB_{nm}$ and the process returns to step 1176 where the steps 1178 and 1180 are repeated to incrementally increase the same tunable bridge resistance $RB_{nm}$ value. If, at 1180, there is a determination made that a CPM of a paired processor core does issue an invalidity warning due to the increase of the paired cores' tunable bridge resistance $RB_{nm}$, then the process proceeds to 1182 where the system undoes the most recent tunable bridge resistance $RB_{nm}$ change and the process proceeds to 1186. At 1186, a determination has been made as to whether all $L_{nm}$'s have been examined. If not all $L_{nm}$'s have been examined and there remains an $L_{nm}$ for the paired core $U_n$, then the process proceeds to 1188 where the index "m" is incremented to m+1 and the process proceeds to 1176 to repeat steps 1178 and 1180 for increasing the tunable bridge resistive device $RB_{nm+1}$ of the next $L_{n(m+1)}$. Step 1178 is then repeated to increase tunable bridge resistance change of $RB_{n(m+1)}$ and the system determines at 1180 whether the CPM has issued an invalidity warning message in which case the process proceeds to either steps 1182 or 1184 to either undo the recent tunable bridge resistance change of $RB_{n(m+1)}$ or commit the increase change of the recent tunable bridge resistance change of $RB_{n(m+1)}$ and the process repeats the increasing of the $RB_{n(m+1)}$ until such time a CPM invalidity warning is issued. At such time, the process will again make the determination at 1186 whether all $L_{nm}$ has been evaluated and if not, increments the value of "m" and evaluates the next $L_{n(m+2)}$ for the current $U_n$. The repetition of steps 1176 through 1188 are repeated until such time at step 1186 that a determination is made that all $L_{nm}$ for the current $U_n$ have been examined at which time the process proceeds to 1190. At 1190, FIG. 11E, a determination is made as to whether there is any $U_n$ or $L_{nm}$ that is weakly failing. If there is no $U_n$ or $L_{nm}$ that is weakly failing, the process proceeds to 1192 where a further determination is made as to whether a stable time T has elapsed. The stable time "T" can be on the order of a time scale commensurate with time constant of a workload change, e.g., milliseconds to seconds. The system idles at 1192 until the determined stable time T has elapsed and the process proceeds to steps 1194. Otherwise, at 1190 if it is determined that there exists a $U_n$ or $L_{nm}$ that is weakly failing, the process proceeds directly to 1194, FIG. 11E. Whether arriving from step 1192 or from step 1190, at 1194, FIG. 11E, the system takes all $RV_n$ and $RG_m$ values for this paired core and decreases their values by a minimum stability step size (e.g. 5%) and the process proceeds back to 1174 where the set of paired cores (e.g., $U_n$, $L_{n0}$, $L_{n1}$, . . . , etc.) are again evaluated by repeating the iterative steps of 1176-1188 shown in FIG. 11E.

In further embodiments, the system power management unit 700 can accommodate a pairing method for multiple upper cores (U) and multiple lower cores (L). The methods depicted in FIG. 11A can be used symmetrically for pairing multiple upper cores with one lower core. Further methods can be implemented to support dynamic reconfiguration with arbitrary groups.

Figure 12:
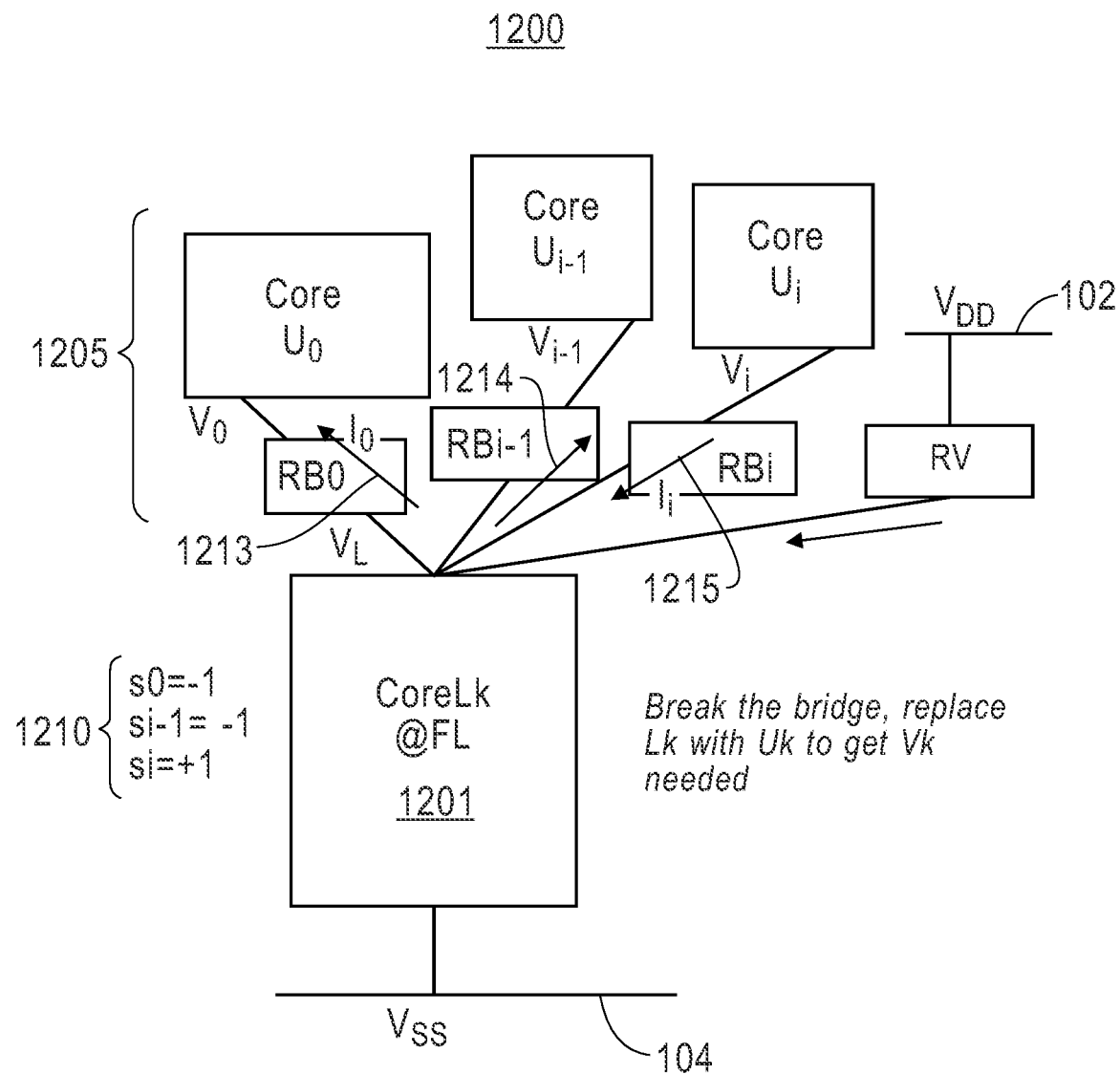
FIG. 12 conceptually depicts such a configuration of a stacked processor core circuit having multiple upper cores ($U_0, \ldots U_{i-1}, U_i$) and a lower core for optimized dynamic voltage and frequency scaling control according to a further embodiment.

FIG. 12 conceptually depicts such a configuration of a stacked processor core circuit 1200 having multiple upper cores ($U_0$, . . . , $U_{i-1}$, $U_i$) and a lower core for optimized dynamic voltage and frequency scaling control according to a further embodiment. In FIG. 12, processor core circuit structure 1200 includes a lower processor core k (e.g., Core $L_k$) device 1201 configured to operate at a target frequency FL. The lower processor Core $L_k$ includes a direct connection to Vss ground reference potential conductor 104, and a connection to the Vdd power voltage supply conductor 102 through upper tunable resistor RV. The lower processor Core $L_k$ includes multiple connections to respective upper processor cores $U_0$, $U_{i-1}$ and $U_i$ of N upper cores 1205 through a respective continuously tunable bridge resistive device $RB_0$, . . . , $RB_{i-1}$ and $RB_i$. At each respective core $U_0$, . . . , $U_{i-1}$ and $U_i$, there is monitored respective upper core voltage values $V_0$, $V_{i-1}$ and $V_i$ while at the lower core, there is monitored a single voltage value $V_L$.

Figure 13:
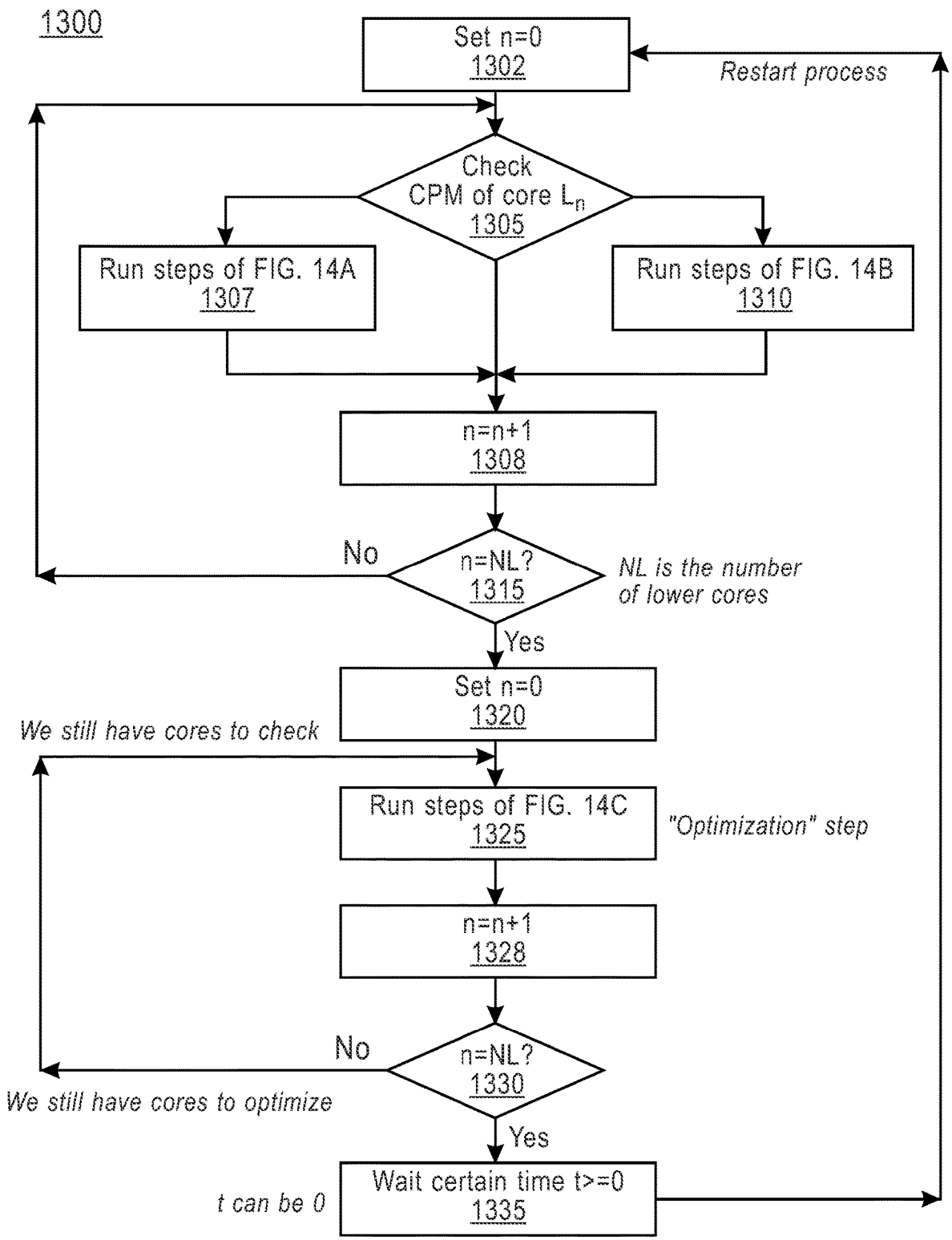
FIG. 13 depicts a flow chart illustrating a method for checking the CPMs and invoking processes to perform $L_i$, $U_i$, core updates with arbitrary upper/lower connections in an embodiment.
Figure 14A:
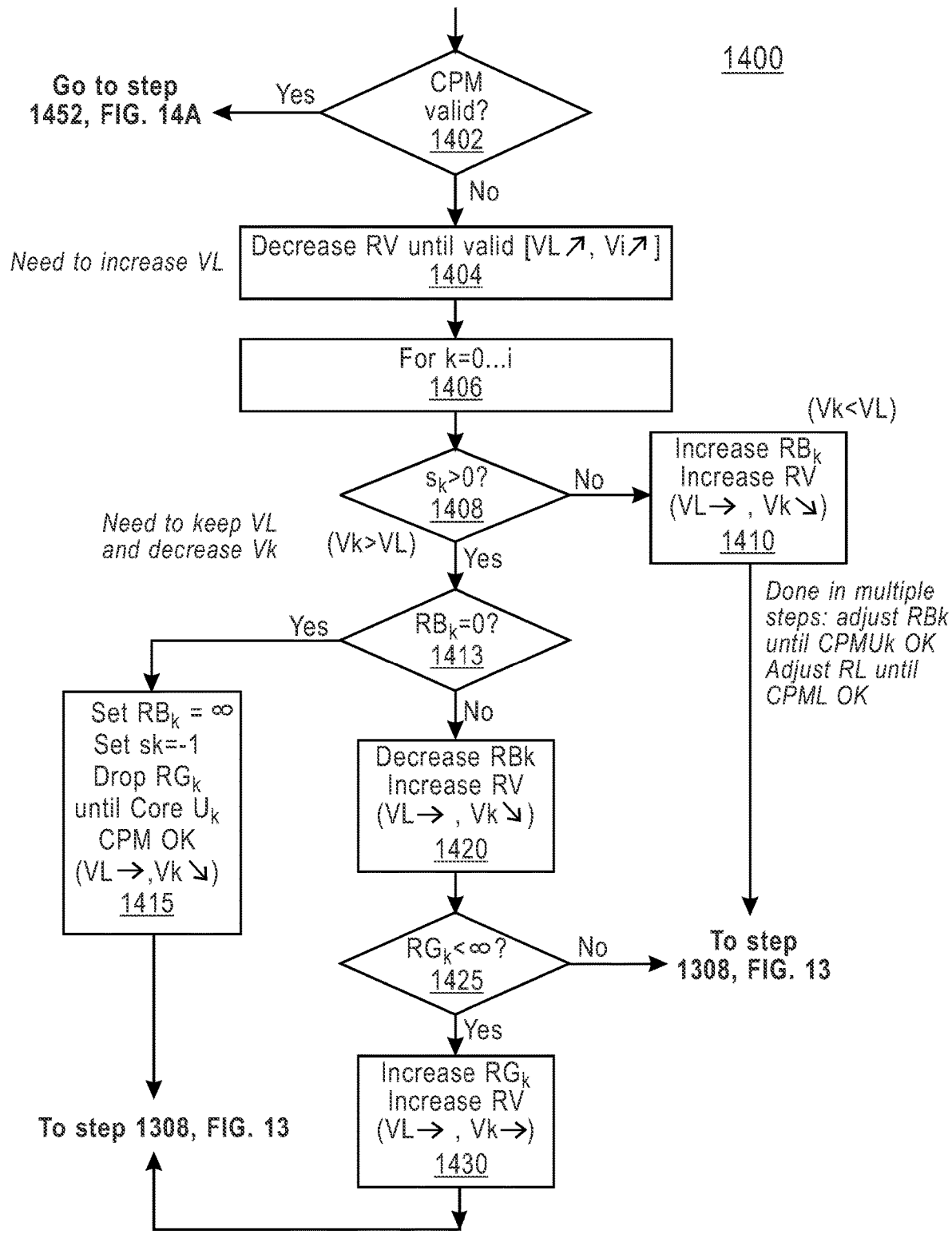
FIGS. 14A-14C depict flow charts illustrating methods for checking the CPMs and invoking processes to perform $L_i$, $U_i$, core updates for arbitrary multiple upper/lower core pairings including the providing of a valid new state and performing a check for new processor core pairing opportunities in an embodiment.
Figure 14B:
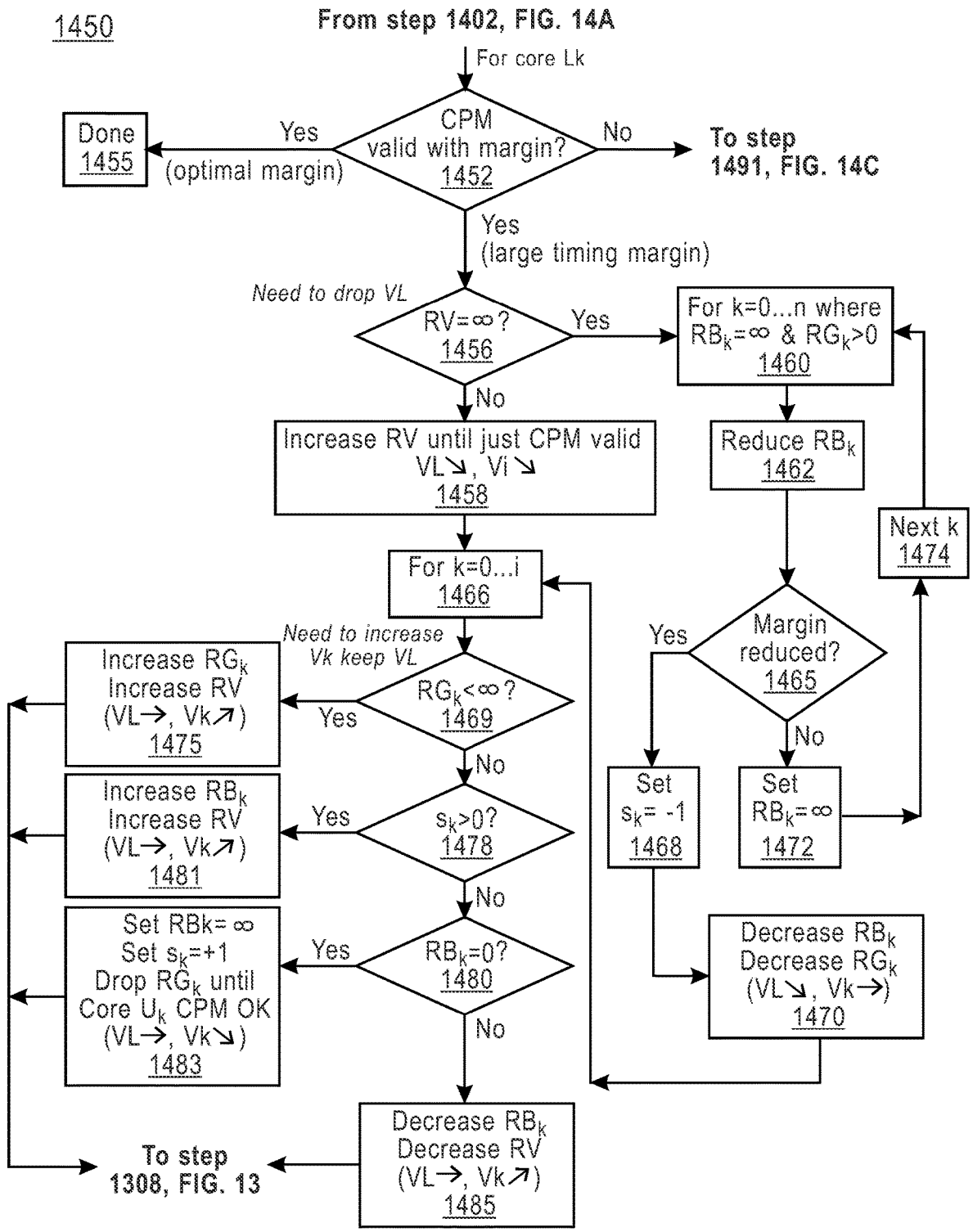
Figure 14C:
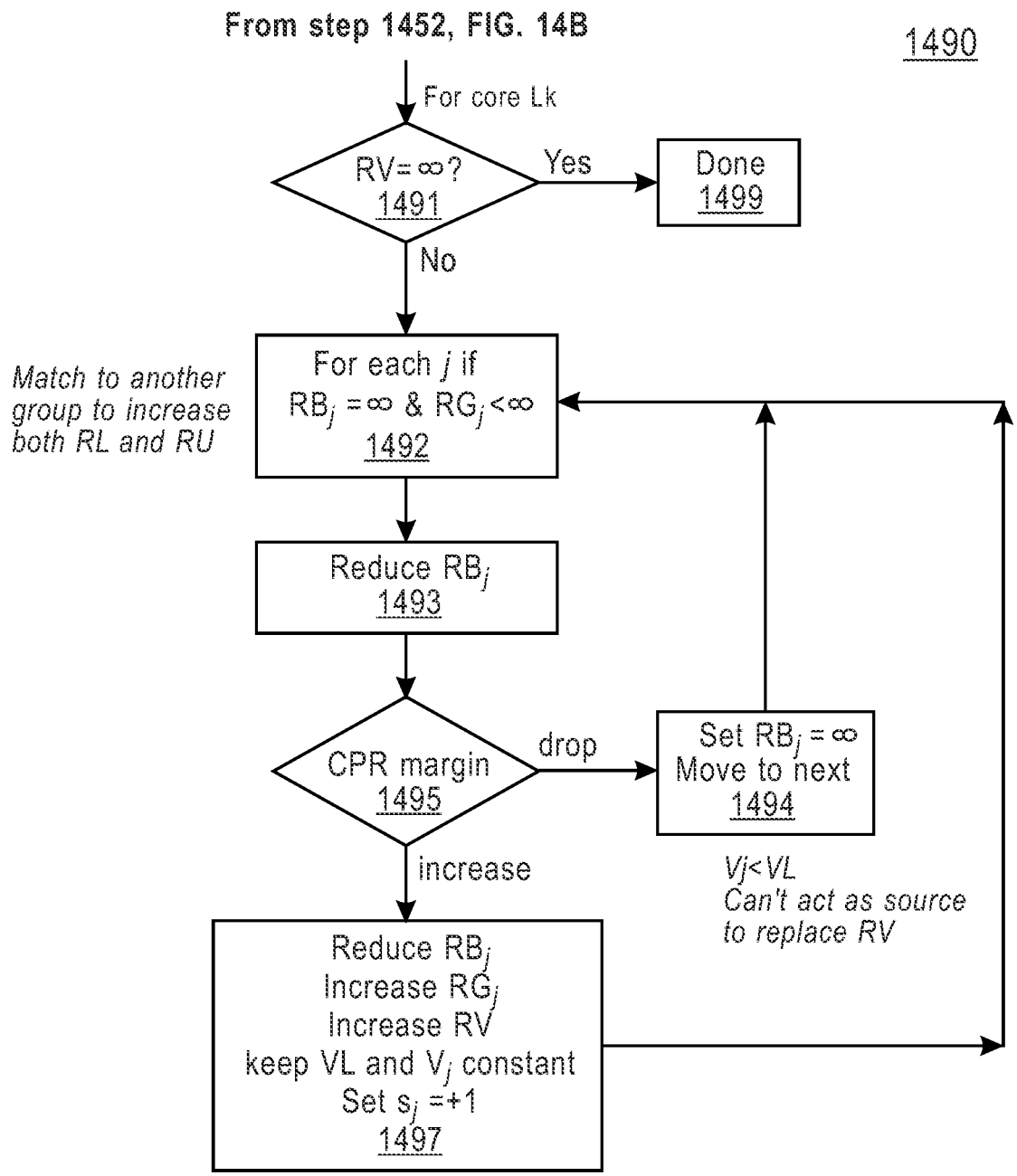

For the exemplary stacked processor core circuit configuration of FIG. 12, methods of FIG. 13 check the CPMs and invokes processes of FIGS. 14A-14C to perform $L_i$, $U_i$ core updates for arbitrary upper/lower pairings including the providing of a valid new state and performing a check for new pairing opportunities including providing a more optimal new state. It is understood that each $U_i$ could also be paired with multiple $L_i$. In an embodiment, management unit 700 includes a memory register for storing a data value indicating a direction of the flow of current through each tunable bridge resistive devices $RB_0$, $RB_{i-1}$ and $RB_i$, i.e., current flow directions $s_0$, $s_{i-1}$ and $s_i$. For example, as shown at 1210, initially the current flow $s_0$ is a value −1 meaning the direction of current flow is away from the lower Core $L_k$ and into Core $U_0$ as shown at 1213 to indicate a voltage $V_0$ less than voltage $V_L$, the current flow $s_{i-1}$ is a value −1 meaning direction of current flow is away from the lower Core $L_k$ and into Core $U_{i-1}$ as shown at 1214 to indicate a voltage $V_{i-1}$ less than voltage $V_L$, and the current flow $s_i$ is a value +1 meaning direction of current flow is into the lower Core $L_k$ from the Core $U_i$, as shown at 1215 to indicate a voltage $V_L$ less than voltage $V_i$.

FIG. 13 shows a high level methodology 1300 for controlling such a stacked processor core circuit configuration of FIG. 12 having multiple upper cores (U) and a single lower core (L). It is understood that same method steps can be modified for configuration of multiple $U_i$ cores paired with multiple $L_i$ cores (i=0, 1, . . . , n, . . . , NL). The steps of FIG. 13 can run continuously in the background at the power management unit 700. In an embodiment, none of the $V_x$'s of FIG. 12 are measured directly, they are only observed via the CPM outputs. Further, it is desired that all the connected cores are running just at an optimal CPM.

For example, assuming a core circuit configuration as shown in FIG. 12, and starting with a correct state with any RV, RG and RB and with a CPM validity being met, a value of index n is set to 0 at 1302. Periodically, the state of each CPM can be monitored, e.g., to detect when a CPM condition may change. FIG. 13, at 1305, is the step to check the CPM monitor of a lower core $L_n$. Different actions are taken in response to the different CPM monitored state. For example, at 1305, if the monitored state of the CPM for core $L_n$ is close to failure or indicates a fail, then the process proceeds to 1307 to run the method steps of FIG. 14A in order to increase the lower core voltage value $V_L$. After performing steps of FIG. 14A for increasing lower core voltage value $V_L$, the method then proceeds to step 1308. Alternatively, if at 1305, if the monitored state of the CPM for core $L_n$ is close is valid with a large margin, then the process proceeds to 1310 to run the method steps of FIG. 14B which is implemented to decrease the lower core voltage value $V_L$. After performing steps of FIG. 14B for decreasing lower core voltage value $V_L$, the method then proceeds to step 1308. Alternatively, if at 1305, if the monitored state of the CPM for core $L_n$ is close is valid with an optimum margin indicating that the lower core voltage value $V_L$ is optimal, then the process proceeds directly to 1308. When process arrives at 1308, FIG. 13, the index "n" is implemented (n=n+1). The method then proceeds to 1315 to determine whether the current lower core $L_n$ is the last of the number, NL, of lower cores. If at 1315, the lower core index value n does not equal NL, i.e., there are still core time margin states to check, the process proceeds back to step 1305 where the CPM monitor checks of the next lower core are performed and the process steps 1305-1315 repeat. Otherwise, at 1315, if the last core $L_n$=NL, then the process proceeds to 1320 where again lower core index n is initialized to 0 and the process proceeds to 1325 to run the method steps of FIG. 14C which are implemented to potentially optimize the core operating state. After performing steps of FIG. 14C for optimizing core voltage value $V_L$, the method then proceeds to step 1328 to increment the lower core index n to n=n+1. The method then proceeds to 1330 to determine whether the current lower core $L_n$ is the last of the number, NL, of lower cores. If at 1330, the lower core index value n does not equal NL, there are still cores remaining that can be processed for optimization and the process proceeds back to step 1325 where the next core is processed for optimization using the method of FIG. 14C and the process for checking core optimization repeats until n=NL. Otherwise, if at 1330, the lower core index value n does equal NL, i.e., there are no more cores that could be optimized, the process waits for a predetermined time interval (e.g., a time >=0) at 1335 and proceeds back to step 1302 where the CPM monitor checks of FIG. 13 are repeated.

To effect the support for dynamic reconfiguration with arbitrary groups of paired multiple upper processor cores $U_0$, $U_{i-1}$ and $U_i$ and the lower processor Core $L_n$, the method of FIG. 13 implements the core updating steps of FIGS. 14A-14C.

FIG. 14A depicts a first CPM monitoring and updating method 1450 performed by power management unit 700. In a first step 1402, at the lower core $L_n$, a determination is made as to whether its CPM monitor indicates valid (optimal) operation in the current connected state as shown in FIG. 7. If, at 1402, the CPM at lower core $L_n$ asserts a valid message, the method continues to step 1452, FIG. 14B to determine if the $V_L$ is optimal. Otherwise, if, at 1402, the CPM at lower core $L_n$ issues an invalid warning message indicating the lower core has failed or is close to failing, the system needs to increase $V_L$ and the method continues to 1404 where the power management unit 700 issues digital signals to control decreasing the upper tunable resistor RV resistance value until the CPM at lower core $L_n$ becomes valid (no longer at or close to timing violation). It is the case that if RV resistance is already 0, the lower core cannot meet the optimal timing margin even at the maximum supply available $V_{DD}$. At 1404, decreasing tunable resistor RV resistance value until the lower core $L_n$ CPM is valid will increase the voltage value $V_L$ at lower core $L_n$ and, as a consequence, each other upper core $U_i$ is checked for any other violations which may require a need to increase the voltage $V_i$ at the other upper cores. Given the change of $V_L$ at lower core $L_n$ node, the method continues at 1406, where an iterative For loop is entered for k=0, 1, . . . , i to check voltages at other upper cores connected by bridge resistors to $L_n$ and, at 1408, to determine the direction of the current flow for each of the other connected upper cores $U_k$ for k=0, 1, . . . , i. That is, at 1408 a determination is made as to current flow directions $s_k$ (indicating either a voltage $V_L > V_k$ at $U_k$ cores or $V_L < V_k$ at $U_k$ cores). For example, if it is determined at 1408 that $s_k < 0$ (i.e., $V_k < V_L$), the process proceeds to 1410 where the system increases $RB_k$ between that $V_k$ and $V_L$ and increases $R_V$ to keep $V_L$ constant while decreasing $V_k$. In an embodiment, this can be performed in multiple steps, e.g., by adjusting $RB_k$ until CPM $U_k$ indicates valid (i.e., is operationally stable or "optimal") and adjusting $R_L$ until CPM $L_n$ indicates valid (is "optimal"). Then the process returns to step 1308, FIG. 13.

Returning to step 1408, FIG. 14A, if it is otherwise determined that $s_k > 0$ and $V_k > V_L$, the process proceeds to 1413 where a further determination is made as to whether tunable bridge resistive device $RB_k$ is zero ohms (i.e., an effective short circuit or its lowest possible value setting), If the tunable bridge resistive device is already equal to zero ohms (voltages Vk and VL are the same), the method proceeds to 1415 where the system sets the $RB_k$ to infinity (open circuit connection), sets current flow direction sk=−1 and reduces the voltage $V_k$ to less than $V_L$ by reducing $RG_k$ until Core $U_k$ CPM indicates a valid ("optimal") operating state when, at such time, the process returns to step 1308, FIG. 13. Otherwise, at 1413, if it is determined that $RB_k$ does not equal zero ohms, the process proceeds to 1420 where the system decreases $RB_k$ and increases RV to keep $V_L$ constant. These actions cause $V_L$ to remain unchanged while $V_k$ decreases. The method then continues to step 1425 where a determination is made as to whether $RG_k$ (for core $U_k$) is less than infinity, the system proceeds to 1430 to then increase $RG_k$ and increase RV until such time as $V_L$ and $V_k$ stabilize or do not change. Then the process returns to step 1308, FIG. 13. Otherwise, returning to 1425, if the tunable resistive device $RG_k$ (for core $U_k$) is not less than infinity ohms, i.e., is equal to infinity ohms, the method returns directly back to step 1308, FIG. 13.

FIG. 14B depicts a further CPM monitoring and updating method 1450 when a CPM issues a valid message such as from step 1402, FIG. 14A and the message indicates a timing margin resulting in the method determining how to reduce voltage across the core. The method 1450 is run for a core $L_n$ when power management unit 700 determines that a CPM associated with a core issues a valid message with a large timing margin in which case the system can decrease $V_L$ at the lower core. In the first step 1452, whether arrived at via step 1402, FIG. 14A or step 1305, FIG. 13, at the lower core $L_n$, a determination is made as to whether its CPM monitor indicates valid (optimal) operation in the current connected state. If, at 1452, the CPM at lower core $L_n$ asserts a valid message indicating an optimal margin, then the method terminates at 1455. Otherwise, if, at 1452, the CPM at lower core $L_n$ asserts a valid message indicating existence of a large timing margin, the method continues to step 1456, FIG. 14B to determine if the RV resistance value is at infinite ohms (e.g., an open circuit). Otherwise, if, at 1452, the CPM at lower core $L_n$ issues an invalid warning message, the method continues to step 1491, FIG. 14C. If, at 1456, it is determined that the RV resistance value is infinite ohms, then the process proceeds to 1460 where a FOR loop is entered to run through each core with index ranging from k=0, 1, . . . , n, and the steps are performed for cores k=0, 1, . . . , i as follows: at 1460, for a bridge resistive device $RB_k$=infinite ohms (tuned to open circuit) and $RG_k > 0$, the method proceeds at 1462 to reduce the tunable bridge resistance $RB_k$ and determine at 1465 if the upper core timing margin for that core k has been reduced. If at 1465, it is determined that the timing margin has not been reduced, then the process proceeds to 1472, FIG. 14B in order to set bridge resistive device $RB_k$ to open circuit (infinite ohms) and proceeds to step 1474 to increment k (to k=k+1) and repeat the steps 1460-1465 for the next upper core. Otherwise, returning to 1465, if, after reducing the tunable bridge resistance $RB_k$ at 1462, it is determined that the timing margin is reduced it can be deduced that Vk<VL, hence the process proceeds to 1468 where $s_k$ is set to −1, and then to 1470, where the system decreases tunable bridge resistive device $RB_k$ and decreases $RG_k$ in order to decrease $V_L$ while $V_k$ is kept constant. After performing step 1470, the process proceeds to 1458, FIG. 14B, where further steps are performed (at the core for current index k) to increase RV until the CPM issues a valid output at that core. The process then proceeds to 1466, FIG. 14B.

Returning to the method step 1456, FIG. 14B, if it is determined that the RV resistance value is less than infinite ohms, the method similarly proceeds to step 1458 increase RV at the core for current index k until the CPM issues a valid timing margin output at that core. Increasing RV at the core k will tend to decrease $V_L$ and $V_k$.

Whether arrived at from step 1456 or step 1470, after performing step 1458, the method continues to step 1466, FIG. 14B, where a FOR loop is then entered to run through each core with index ranging from core k=0, 1, . . . , i, and the steps are performed for cores k=0, 1, . . . , i as follows: at 1469, a decision is made as to whether $RG_k$ resistance is currently tuned to less than infinity ohms. At 1469, if it is determined that $RG_k$ resistance is currently tuned to less than infinity ohms, the process proceeds to 1475 where power management unit issues digital signals to control increasing $RG_k$ and increasing RV which will result in $V_L$ remaining constant and increasing $V_k$. After performing step 1475, the process proceeds back to step 1308, FIG. 13. Returning to 1469, if it is determined that $RG_k$ resistance is currently tuned to infinity ohms (open circuit), the process proceeds to 1478, FIG. 14B, where a decision is made as to check the current flow direction specifically to determine whether the current flow at the upper core $U_k$ is greater than zero (i.e., sk>0). If at 1478, it is determined that the current flow at the upper core $U_k$ is greater than zero, the process proceeds to 1481 where power management unit issues digital signals to control increasing tunable bridge resistance $RB_k$ and increasing RV which will result in $V_L$ remaining constant and increasing $V_k$. After performing step 1481, the process proceeds back to step 1308, FIG. 13. Otherwise, at 1478, if it is determined that the current flow at the upper core $U_k$ is not greater than zero (i.e., negative direction), the process proceeds to 1480 where a determination is next made as to whether tunable bridge resistance $RB_k=0$ ohms (i.e., a short circuit). If tunable bridge resistance $RB_k=0$ ohms, then the process proceeds to 1483 where power management unit issues digital signals to cut the bridge resistance, and replace $L_n$ with $U_k$ i.e., sets the tunable bridge resistance $RB_k$ to infinite ohms, sets the current direction to the upper core $U_k$ to positive ($s_k=+1$) and further drops/reduces $RG_k$ until the CPM monitor at the core $U_k$ is valid such that $V_L$ remains constant and $V_k$ decreases. The process then returns back to step 1308, FIG. 13. Otherwise, at 1480, if it is determined that tunable bridge resistance $RB_k$ does not equal zero ohms, then the process proceeds to 1485 where power management unit issues digital signals to control decreasing the tunable bridge resistance $RB_k$ and decreasing RV resistance, which results in $V_L$ remaining constant and $V_k$ increasing. Then the process returns to step 1308, FIG. 13.

FIG. 14C depicts a further CPM monitoring method 1490 that corresponds to step 1325 of FIG. 13 or is arrived at from step 1452, FIG. 14B, for checking viability of new core pairings, i.e., determining if a further processor core circuit structure(s) that are not currently paired with the lower core can be paired for connection to the power rails and operate at modes so as to optimize voltage and frequency scaling. Specifically, the method of FIG. 14C provides functionality to replace some of the current fed to the lower core from the resistor RV with some current coming from another upper core, in order to maximize current recycling. This mew pairings check can be interleaved with the CPM monitoring/updating of FIGS. 14A-14B.

At a first step 1491, FIG. 14C, a decision is made as to whether the lower core head resistor RV is set to infinite ohms (open circuit). If the lower core resistive device RV is set to infinite ohms, then the process proceeds to step 1499 and the method terminates or depending upon the implementation, returns to step 1328, FIG. 13. Otherwise, at 1491, if the current RV setting is not infinite, i.e., not an open circuit, the method proceeds to step 1492 to match the current core to another group to increase both RV and RG. At 1492, the method performs, for each j, if $RB_j=\infty$ and $RG_j<\infty$, the method proceeds to 1493, the power management unit issues digital signals to control reducing the tunable bridge resistance $RB_j$ and the method proceeds to 1495 where the CPR timing margin value is evaluated to determine whether the core's timing margin has dropped or increased. If at 1495, it is determined that the CPM timing margin has dropped, then the method proceeds to 1494, FIG. 14C where the power management unit issues digital signals to control setting tunable bridge resistance $RB_j$ to infinite ohms and then moves to the next j (increase index) to return to step 1492 to repeat steps 1492 to 1495. It is noted that, in that case, Vj<VL, i.e., the voltage of the upper core that is trying to be paired with is lower than the upper voltage of the lower core. Hence, the upper core cannot provide current to the lower core and there is no opportunity for further charge recycling.

Otherwise, returning to 1495, FIG. 14C, if it is determined that the CPM timing margin has increased, then the method proceeds to 1497 where the power management unit issues digital signals to control for reducing tunable bridge resistance $RB_j$, increases $RG_j$, increases RV while keeping VL and Vj constant and further sets the current direction $s_j=+1$. The method then proceeds directly back to step 1492 to repeat steps 1492 through 1495 for the subsequent upper cores.

The method described in FIGS. 13, 14 presents the dynamic adjustment of lower cores, assuming that upper cores have fixed (i.e., static) activity profile. As upper and lower cores and RV/RG have a symmetric role, the method can be directly modified for the case of the dynamic adjustment of upper cores, assuming that lower cores have fixed (i.e., static) activity profile. Further, the methods can also be directly modified for the dynamic adjustment of both upper and lower cores, for example by alternating the methods, running them in parallel, or time-interleaving them.

Figure 15:
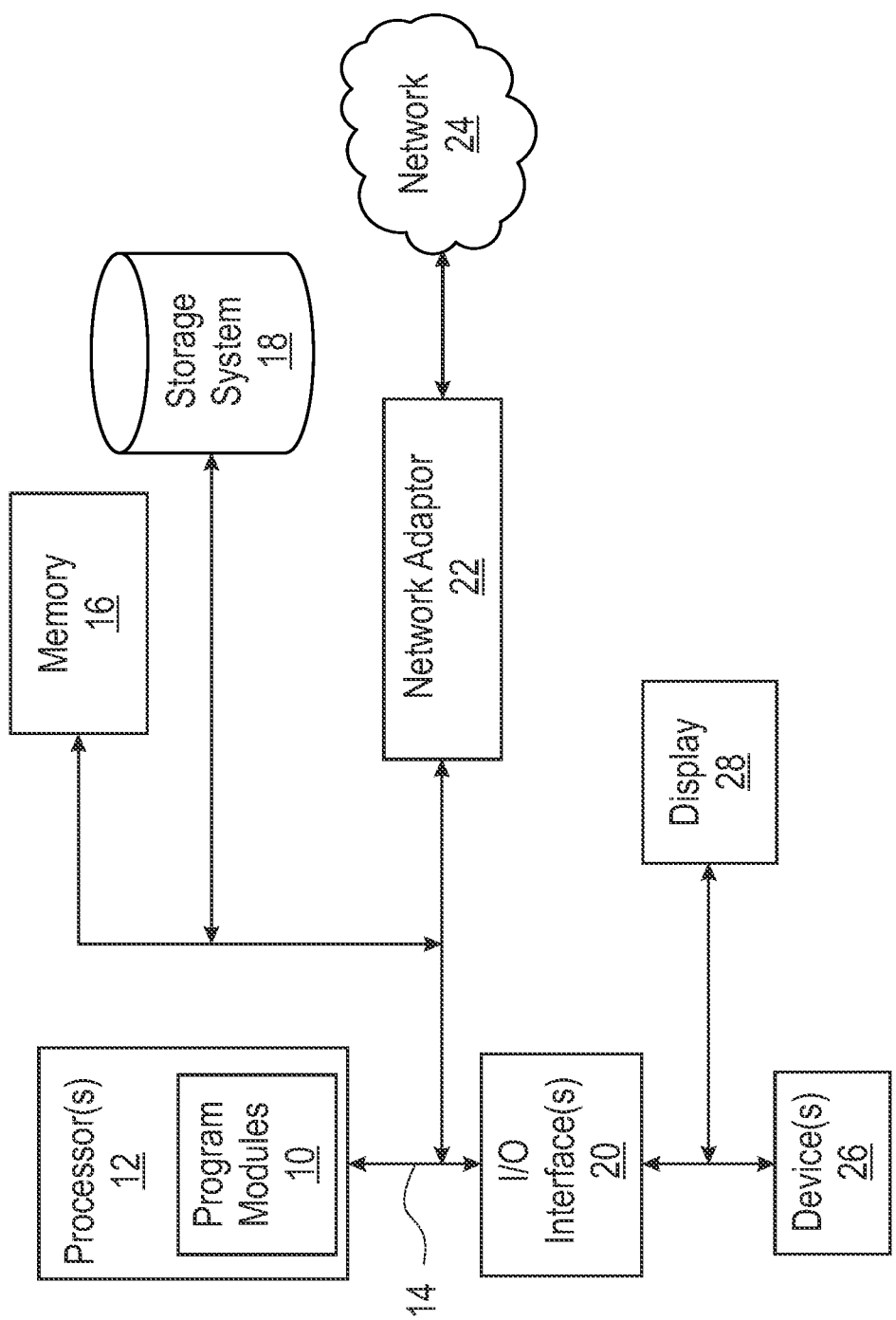
FIG. 15 illustrates an example computing system in accordance with an embodiment.

FIG. 15 illustrates an example computing system in accordance with the present invention that may provide the power management control unit functions depicted in the methods described in FIGS. 11A-11E, 13 and 14A-14C for controlling the stacked network of processor cores interconnected by controllable resistive elements in such a way that dynamic re-configuration of the resistive elements allows trade-offs between computational performance and power efficiency. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIGS. 8-9 may include, but are not limited to, integrated circuits, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules 10 may include routines, programs, objects, components, logic, data structures, and so on that perform particular tasks and/or implement particular input data and/or data types in accordance with the methods described herein with respect to FIGS. 11A-11E, 13 and 14A-14C.

The components of the computer system may include, but are not limited to, one or more processors or processing units 12, a memory 16, and a bus 14 that operably couples various system components, including memory 16 to processor 12.

In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20. Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. Although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for dynamic voltage and frequency scaling of operating processing cores, the system comprising:
    a stacked circuit configuration including at least two or more processor core devices, each processor core device having a first terminal for connection to a first voltage rail conductor and having a second terminal connection for connection to a second lower voltage rail conductor, each said processor core device comprising a state monitor unit for monitoring a functional state of said processor core device;
    a current provision network comprising first tunable current supplying devices interconnecting first terminals of a plurality of said at least two or more processor core devices to the first voltage rail conductor and second tunable current supplying devices interconnecting the second terminals of a plurality of said at least two or more processor core devices to the second lower voltage rail conductor, and a plurality of tunable bridge current supplying devices interconnecting a first terminal of each of a respective subset of processor core devices to a second terminal of each of a plurality of other processor core devices of said subset; and
    a control unit including a processor for receiving real-time functional state monitor signals issuing from said state monitor unit of said processor core devices and issuing one or more control signals and for adjusting a resistance of one or more said first tunable current supplying devices, said second tunable current supplying devices or said tunable bridge current supplying devices to thereby adjust a voltage across a processor core device to achieve a target frequency of operation at said processor core in response to the received real-time state monitor signals.

2. The system as claimed in claim 1, wherein said stacked circuit configuration comprises N stacked processor core devices, a first processor core of said N processor core devices includes a first terminal directly connected to said first voltage rail conductor; and the $N^{th}$ processor core of said at least two or more processor core devices includes a second terminal directly connected to said second lower voltage rail conductor and wherein each core i having N+1 tunable current supplying device connections comprising: a first tunable current supplying device connection from said first terminal to said first voltage rail conductor, said second tunable current supplying device terminal connection from said second terminal to said second lower voltage rail conductor; and a respective tunable bridge current supplying device connection to other N−1 processor cores.

3. The system of claim 2, wherein each functional state monitor device comprises: a critical path monitor for ascertaining a critical path delay using at least one of: a replica monitor or in-situ monitor with multiple thresholds for granular definition of functional correctness.

4. The system of claim 1, wherein some or all of the tunable first, second and bridge current supplying devices are implemented as tunable linear resistors.

5. The system of claim 1, wherein said control unit adjusts a current delivering capability of one or more said first tunable current supplying devices, said second tunable current supplying devices or said tunable bridge current supplying devices to optimize an operating voltage of a processor core device for achieving a desired computational function with minimal power consumption.

6. The system of claim 1, wherein said stacked circuit configuration of processor cores includes a configuration of multiple stacked core circuit units, each stacked core circuit unit comprising:
  a lower processor core device having a first terminal connected to said first voltage rail conductor through a first tunable current supplying device and a second terminal connected directly to said second lower voltage rail conductor,
  one or more upper processor core devices, each having a first terminal directly connected to said first voltage rail conductor, a second terminal connected to said second lower voltage rail conductor through a second tunable current supplying device, and
  a plurality of tunable bridge current supplying devices interconnecting the first terminal of said lower processor core device to the second terminal of each said one or more upper processor core devices.

7. The system of claim 6, wherein said control unit receives a target clock frequency of operation of said upper processor core and lower processor core, said control unit issuing a digital control signal for controlling a resistance value of said tunable bridge current supplying device to its maximum, and issues a digital control signal for controlling a resistance value of each said first tunable current supplying device and second tunable current supplying device to a highest value that does not result in a functional failure within a predetermined margin of said upper processor core or lower processor core, and then said control unit issuing a digital control signal for reducing a resistance value of said tunable bridge current supplying device from its maximum to thereby adjust a voltage across both said upper processor core and lower processor core.

8. The system of claim 1, wherein said control unit implements logic for issuing control signals for pairing one or more additional upper processor cores to one or more lower processor cores of said stacked circuit unit.

9. The system of claim 1, wherein said stacked circuit configuration including at least two or more processor core devices and elements of said current provision network spans a single silicon die or expand across a multi-die framework.

10. A method for dynamic voltage and frequency scaling of operating processing cores, the method comprising:
  configuring one or more stacked processor core units, each stacked processor core unit comprising:
    a lower processor core device having a first terminal connected to a first voltage rail conductor through a first tunable current supplying device and a second terminal connected directly to a second lower voltage rail conductor,
    one or more upper processor core devices, each upper core device having a first terminal directly connected to said first voltage rail conductor and a second terminal connected to said second lower voltage rail conductor through a second tunable current supplying device, wherein the upper processor core device and lower processor core device each comprises a state monitor unit for monitoring a functional state of that processor core device and generating corresponding feedback signals; and
    a respective tunable bridge current supplying device interconnecting the first terminal of said lower processor core device to the second terminal of each respective one or more upper processor core devices; and
  controlling, using a control processor, based on said feedback signals obtained from each said state monitor unit of a lower processor core device or upper processor core device, a resistance value of one or more said first tunable current supplying device, said second tunable current supplying device and said tunable bridge current supplying device to ensure stable functional operation of said lower or upper processor core devices to achieve a target voltage or frequency of said respective lower or upper processor core.

11. The method of claim 10, further comprising:
  initializing the operational cores fully in parallel by tuning, using said control processor, the first tunable current supplying device to a short circuit resistance, and said second tunable current supplying device tuned to a short circuit resistance, and said tunable bridge current supplying device to its maximum value; and then
  increasing, using said control processor, each said first tunable current supplying device and said second tunable current supplying device to a respective largest value that ensures stable functional operation of said upper and lower processor cores.

12. The method of claim 11, further comprising:
  selecting a new upper processor core to said stacked circuit of processor cores by:
  interconnecting a further tunable bridge current supplying device between said first terminal of said lower processor core device to a second terminal of an unpaired upper processor core and tuning said further tunable bridge current supplying device set to a minimum resistance value.

13. The method of claim 12, wherein said selecting a new upper processor core to said stacked circuit of processor cores comprises:
  selecting an upper processor core device having a lowest second tunable current supplying device resistance value, said method further comprising:
  increasing, using said control processor, a resistance of each said first tunable current supplying device value and said second current supplying device to a respective largest value that ensures stable functional operation of said upper and lower processor core devices.

14. The method of claim 13, further comprising, for each said paired upper processor core device:
incrementally increasing, using said control processor, a resistance value of a tunable bridge current supplying device value connecting terminals of said lower processor core and a current said upper processor core device to a highest value that ensures stable functional operation of said upper and lower processor core devices.

15. The method of claim 10, further comprising:
monitoring, at said control processor, each respective said state monitor unit for feedback comprising a functional state of each respective processor core, and one of:
responsive to determining a functional state of a core as being a failure or close to failing, then adjusting, using said control processor, a resistance of one or more said first tunable current supplying device, said second tunable current supplying device or said tunable bridge current supplying device to increase a voltage across the lower processor core; or
responsive to determining a functional state of a core as being at a stable operation state with a large timing margin, then adjusting, using said control processor, a resistance of one or more said first tunable current supplying device, said second tunable current supplying device or said tunable bridge current supplying device to decrease a voltage across the lower processor core; or
responsive to determining a functional state of a core as being valid with an optimal timing margin, then adjusting, using said control processor, a resistance of one or more said first tunable current supplying device, said second tunable current supplying device or said tunable bridge current supplying device to check whether a new upper processor can be paired to the lower processor core.

16. A method for dynamically controlling stacked processor core network including multiple operating processor core devices, the method comprising:
configuring a resistance value of a first tunable current supplying device connecting a higher voltage terminal of a lower processor core device to a first voltage rail conductor, a lower voltage terminal of said lower processor core device connected directly to a second lower voltage rail conductor;
configuring a resistance value of each of multiple second tunable current supplying devices, each respective second tunable current supplying device connecting a lower voltage terminal of a respective said upper core device of multiple second processor core devices to the second lower voltage rail conductor, a higher voltage terminal of each respective said upper core device of multiple upper processor core devices connected directly to the first voltage rail conductor;
configuring a resistance value of each of multiple tunable bridge current supplying devices, each respective tunable bridge current supplying device interconnecting the lower voltage terminal of each respective multiple upper processor core device to the higher voltage terminal of said lower processor core device, wherein each upper processor core device and lower processor core device comprises a state monitor unit for monitoring a timing margin state of that respective upper processor core or lower processor core device and generating a corresponding feedback signal;
detecting, using a functional state monitor device at each said operating processor core device currently paired to one or more other processor core devices, when a functional timing margin state condition changes at said operating processor core device;
generating, by said respective functional state monitor device, a feedback signal when the timing margin state condition changes at said operating processor core device; and
tuning, using a control processor, based on the generated feedback signal, the resistance value of one or more said first tunable current supplying device, said second tunable current supplying device or one or more respective said tunable bridge current supplying devices to achieve an optimal timing margin at said operating processor core device and respective currently paired one or more other processor core devices.

17. The method of claim 16, wherein one of: the operating processor core device is an upper processor core device and the other multiple processor core devices are lower processor core devices, or the operating processor core device is a lower processor core device and the other multiple processor core devices are upper processor core devices.

18. The method of claim 17, wherein said tuning comprises:
detecting when the monitored functional state for the processor core device indicates a close to a failing timing condition, and responsively adjusting the resistance value of one or more said first tunable current supplying device, said second tunable current supplying device and said interconnected tunable bridge current supplying device for increasing the core voltage value across the two terminals of said processor core device without affecting the voltage across said lower and higher voltage terminals of each of said other connected processor core devices.

19. The method of claim 17, wherein said tuning comprises:
detecting when the monitored functional state for the lower processor core device is functional with a large time margin, and responsively adjusting the resistance value of one or more said first tunable current supplying device, said second tunable current supplying device and said interconnected tunable bridge current supplying device for decreasing the core voltage value across the lower and higher voltage terminals of each of the other connected processor core devices.

20. The method of claim 17, wherein said tuning comprises:
detecting when the monitored functional state for the lower processor core device is close to optimal with an optimum margin indicating that the lower core voltage value at the higher voltage terminal of said lower processor core device is optimal, and in response,
identifying if said processor core can be connected to additional devices by interconnected tunable bridge current supplying device; and
checking a functional state of any further lower processor core device and optimizing its timing margin state if the monitored functional state for the further lower processor core device indicates or is close to a failing timing condition or is functional with a large time margin.

* * * * *